US012811319B2

(12) United States Patent
Ashibu

(10) Patent No.: US 12,811,319 B2
(45) Date of Patent: Nov. 24, 2026

(54) TERMINAL UNIT HAVING A PROJECTION CONTACT FOR CONTACTING AN ELECTRIC WIRE END THROUGH A THROUGH HOLE

(71) Applicant: Japan Aviation Electronics Industry, Limited, Tokyo (JP)

(72) Inventor: Kenta Ashibu, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 348 days.

(21) Appl. No.: 18/661,497

(22) Filed: May 10, 2024

(65) Prior Publication Data

US 2025/0079730 A1 Mar. 6, 2025

(30) Foreign Application Priority Data

Aug. 30, 2023 (JP) ................................ 2023-139556

(51) Int. Cl.

| | |
|---|---|
| ***H01R 11/01*** | (2006.01) |
| ***H01R 4/26*** | (2006.01) |
| ***H01R 4/48*** | (2006.01) |
| ***H01R 4/60*** | (2006.01) |
| ***H01R 13/20*** | (2006.01) |

(52) U.S. Cl.

CPC ............... *H01R 11/01* (2013.01); *H01R 4/26* (2013.01); *H01R 4/48* (2013.01); *H01R 4/60* (2013.01); *H01R 13/20* (2013.01)

(58) Field of Classification Search

None

See application file for complete search history.

(56) References Cited

U.S. PATENT DOCUMENTS

| | | | |
|---|---|---|---|
| 9,318,818 | B2 | 4/2016 | Nakamura et al. |
| 2003/0143873 | A1 | 7/2003 | Burmeister |
| 2023/0208062 | A1 | 6/2023 | Ashibu |

FOREIGN PATENT DOCUMENTS

| | | | |
|---|---|---|---|
| JP | 2014-107079 | A | 6/2014 |
| JP | 2022-150224 | A | 10/2022 |
| JP | 2023-097644 | A | 7/2023 |

OTHER PUBLICATIONS

European Patent Office, "Extended European Search Report for European Patent Application No. 24185519.6," 1 Dec. 5, 2024.

*Primary Examiner* — Oscar C Jimenez

(74) *Attorney, Agent, or Firm* — Kreative IP Management LLC; Fuiyeong Kim

(57) ABSTRACT

A terminal unit in which electric resistance is small and heat generation is little even if large electric current is applied, is provided. The terminal unit comprises a first terminal, a second terminal which is assembled to and connected with the first terminal, an electric wire end which is connected with the second terminal, and a pressing member which presses the first terminal and the second terminal against each other for contact. In a state where the first terminal and the second terminal are assembled and contacted with each other, at least one projection contact of the first terminal directly contacts the electric wire end through at least one through hole of the second terminal.

4 Claims, 34 Drawing Sheets

Prior Art

Prior Art

TERMINAL UNIT HAVING A PROJECTION CONTACT FOR CONTACTING AN ELECTRIC WIRE END THROUGH A THROUGH HOLE

CROSS-REFERENCE TO RELATED APPLICATION

This application is based on and claims priority to Japanese Patent Application No. 2023-139556 filed on Aug. 30, 2023, the entire disclosures of which are hereby incorporated by reference herein.

BACKGROUND OF THE INVENTION

Field of the Invention

The present invention relates to a terminal unit.

Description of the Related Art

Conventionally, a terminal unit including a first terminal, a second terminal which is assembled in and connected with the first terminal, the second terminal being connected with an electric wire end, and an elastic member as a pressing member which presses the first terminal and the second terminal against each other for contact, has been publicly-known. Japanese Patent Laid-Open No. 2022-150224 is a prior art document disclosing this type of terminal unit. As illustrated in FIG. 33, a conventional terminal unit (10) disclosed in Japanese Patent Laid-Open No. 2022-150224 includes a first terminal (12), a second terminal (14), and an elastic member (16). The first terminal (12) has a first side opposing surface (24) which opposes the second terminal (14) in a left direction and is pushed to the second terminal (14) side, and the second terminal (14) has an electric wire connecting part (32) connected with an electric wire (18) and a second side opposing surface (38) which opposes the first terminal (12) in a right direction and is pushed to the first terminal (12) side. The second side opposing surface (38) has an engaging projection (40) extending in an assembly direction of the first terminal (12) and the second terminal (14) and projecting in the right direction, and the first side opposing surface (24) has a first contact surface (28) and a second contact surface (30) extending in the assembly direction and contacting the engaging projection (40) on both sides in a front and back direction orthogonal to both the assembly direction and the left direction. It should be noted that, reference signs relating to descriptions of the prior art document are enclosed in brackets for distinction from embodiments of the invention of the present application.

However, the terminal unit (10) of the conventional art disclosed in the above-described Japanese Patent Laid-Open No. 2022-150224 has a problem in that, at the time of conduction of the electric wire (18) and the first terminal (12), since the whole electrical resistance in which contact resistance and conductor resistance are added is large, heat is generated upon applying large electric current, and thus the terminal unit (10) is unsuitable for dealing with large electric current.

Therefore, the purpose of the present invention is to provide a terminal unit in which, by bringing a first terminal into direct contact with an electric wire end connected with a second terminal when assembling the first terminal and the second terminal, electric resistance is made small and heat generation is made little even if large electric current is applied at the time of electrical conduction of the electric wire end and the first terminal.

SUMMARY OF THE INVENTION

A terminal unit according to the present invention comprises: a first terminal; a second terminal which is assembled in and connected with the first terminal, the second terminal being connected with an electric wire end; and a pressing member which presses the first terminal and the second terminal against each other for contact, wherein the first terminal has one or more projection contacts projecting in a direction orthogonal to a first terminal side assembly surface in which the second terminal is to be assembled, the second terminal has one or more through holes through which the electric wire end can be visually observed from a second terminal side assembly surface in which the first terminal is to be assembled, and in a state where the first terminal and the second terminal are assembled, and are pressed by the pressing member and brought into contact, the projection contacts of the first terminal go through the through holes of the second terminal and directly contact the electric wire end.

In other words, in the terminal unit according to the present invention, since the projection contacts of the first terminal go through the through holes of the second terminal and directly contact the electric wire end, electric resistance (electric resistance from the electric wire end to the first terminal) of the terminal unit does not include electric resistance of the second terminal. In contrast, in the terminal unit according to the conventional art illustrated in FIG. 33, since the second terminal is interposed between the first terminal and the electric wire end, the electric resistance of the terminal unit includes "contact resistance of the electric wire end and the second terminal", "conductor resistance of the second terminal", and "contact resistance of the second terminal and the first terminal" as the electric resistance of the second terminal, and the whole electrical resistance becomes large. That is to say, with the terminal unit according to the present invention, it is possible to achieve a terminal unit in which the whole electrical resistance is smaller as compared to the conventional art and heat generation is little even if large electric current is applied.

Another terminal unit according to the present invention comprises: a first terminal; and a second terminal which is assembled in and connected with the first terminal, the second terminal being connected with an electric wire end, wherein the first terminal is an elastic socket in a cylindrical shape, the second terminal is a round pin, the elastic socket forming the first terminal has one or more projection contacts projecting to the second terminal side when the first terminal and the second terminal are assembled, the round pin forming the second terminal has one or more through holes through which the electric wire end can be visually observed, and in a state where the first terminal and the second terminal are assembled and brought into contact, the projection contacts of the first terminal go through the through holes of the second terminal and directly contact the electric wire end.

In addition, in the terminal unit according to the present invention, the electric wire end is a twisted wire having flexibility, and in a state where the first terminal and the second terminal are assembled and brought into contact with each other, the projection contacts of the first terminal dig into the twisted wire.

In other words, in the terminal unit according to the present invention, since the projection contacts of the first terminal dig into the twisted wire, contact of the first terminal and the electric wire end can be made more certain, and dimensional tolerance of the projection contacts can be absorbed, thereby suppressing looseness in an assembly state of the first terminal and the second terminal.

Furthermore, in the terminal unit according to the present invention, the first terminal side assembly surface of the first terminal and the second terminal side assembly surface of the second terminal are both in flat-plate shapes, the second terminal and the electric wire end are connected by adhesion, the one or more projection contacts possessed by the first terminal are in a projected shape of a quadrilateral, the one or more through holes possessed by the second terminal are in a quadrilateral penetrating shape corresponding to the quadrilateral of the projection contacts, and the one or more projection contacts possessed by the first terminal go through the one or more through holes possessed by the second terminal and directly contact the electric wire end.

Furthermore, in the terminal unit according to the present invention, the first terminal side assembly surface of the first terminal and the second terminal side assembly surface of the second terminal are both in flat-plate shapes, the second terminal and the electric wire end are connected by pressure bonding, the one or more projection contacts possessed by the first terminal are in a projected shape of a quadrilateral, the one or more through holes possessed by the second terminal are in a quadrilateral penetrating shape corresponding to the quadrilateral of the projection contacts, and the one or more projection contacts possessed by the first terminal go through the one or more through holes possessed by the second terminal and directly contact the electric wire end.

Still another terminal unit according to the present invention comprises: a first terminal; a second terminal which is assembled in and connected with the first terminal, the second terminal being connected with an electric wire end; and a pressing member which presses the first terminal and the second terminal against each other for contact, wherein the first terminal has a first terminal side assembly surface in which the second terminal is to be assembled, the first terminal side assembly surface being in a flat-plate shape, the second terminal has one or more spherical contacts retained rotatably with respect to a second terminal side assembly surface in which the first terminal is to be assembled, and in a state where the first terminal and the second terminal are assembled, and are pressed by the pressing member and brought into contact, the spherical contacts of the second terminal directly contact the first terminal side assembly surface of the first terminal in the flat-plate shape, and also directly contact the electric wire end connected with the second terminal.

In addition, in still another terminal unit according to the present invention, the one or more spherical contacts possessed by the second terminal are balls in a spherical shape, and the balls as the spherical contacts are rotatably retained by ball holding holes formed in the second terminal, the electric wire end attached to an opposite side of the second terminal side assembly surface so as to block the ball holding holes, and a ball presser plate being attached to the side of the second terminal side assembly surface in a state where the balls are stored in the ball holding holes, and retaining a portion of a top surface of the balls in a state projecting to the first terminal side.

According to the present invention, by bringing a first terminal into direct contact with an electric wire end connected with a second terminal when assembling the first terminal and the second terminal, it is possible to provide a terminal unit in which electric resistance is small and heat generation is little even if large electric current is applied at the time of electrical conduction of the electric wire end and the first terminal.

DETAILED DESCRIPTION OF THE PREFERRED EMBODIMENTS

Figure 1:
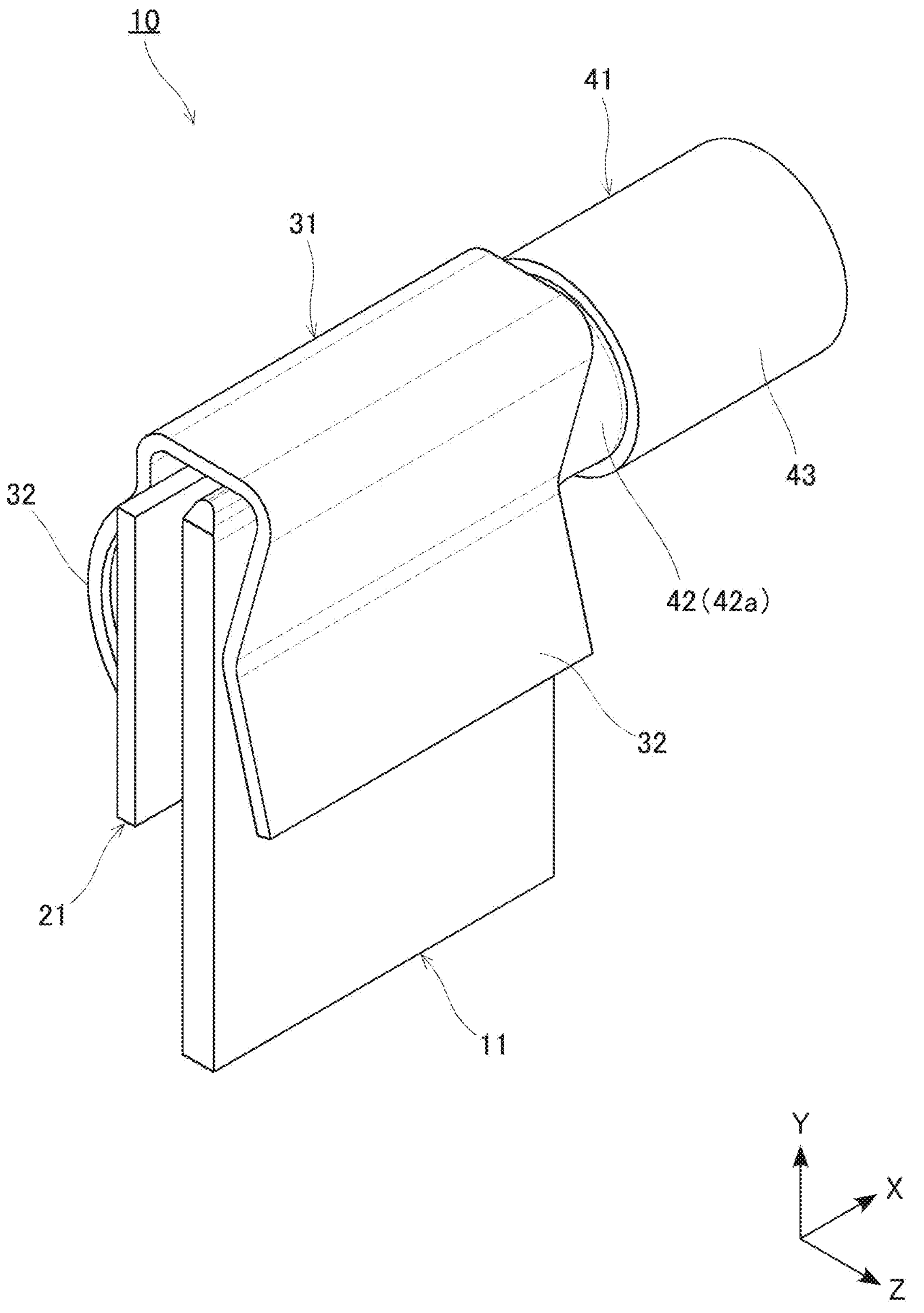
FIG. 1 is an external perspective view of a terminal unit according to a first embodiment, seen from the front upper left.

Hereinafter, preferred embodiments for carrying out the present invention will be described by using the drawings. It should be noted that the present invention defines a first direction, a second direction, and a third direction, and in the drawings, each direction is illustrated as an X direction, a Y direction, and a Z direction for convenience of explanation. In the present specification, the first direction is a right and left direction. In the drawings, the right and left direction is illustrated as the X direction. In particular, the right side is the +X direction, and the left side is the −X direction. In addition, in the present specification, the second direction is an up and down direction. In the drawings, the up and down direction is illustrated as the Y direction. In particular, the upper side is the +Y direction, and the lower side is the −Y direction. Furthermore, in the present specification, the third direction is a front and back direction. In the drawings, the front and back direction is illustrated as the Z direction. In particular, the front side is the +Z direction, and the back side is the −Z direction.

In addition, each of the following embodiments does not limit the invention according to each claim, and not all of the combinations of features described in each of the embodiments are necessary to the solving means of the invention.

First Embodiment

A terminal unit 10 according to a first embodiment will be described by using FIG. 1 to FIG. 8.

As illustrated in FIG. 1 to FIG. 4, the terminal unit 10 according to the first embodiment includes a first terminal 11, a second terminal 21, and a pressing member 31.

Figure 5:
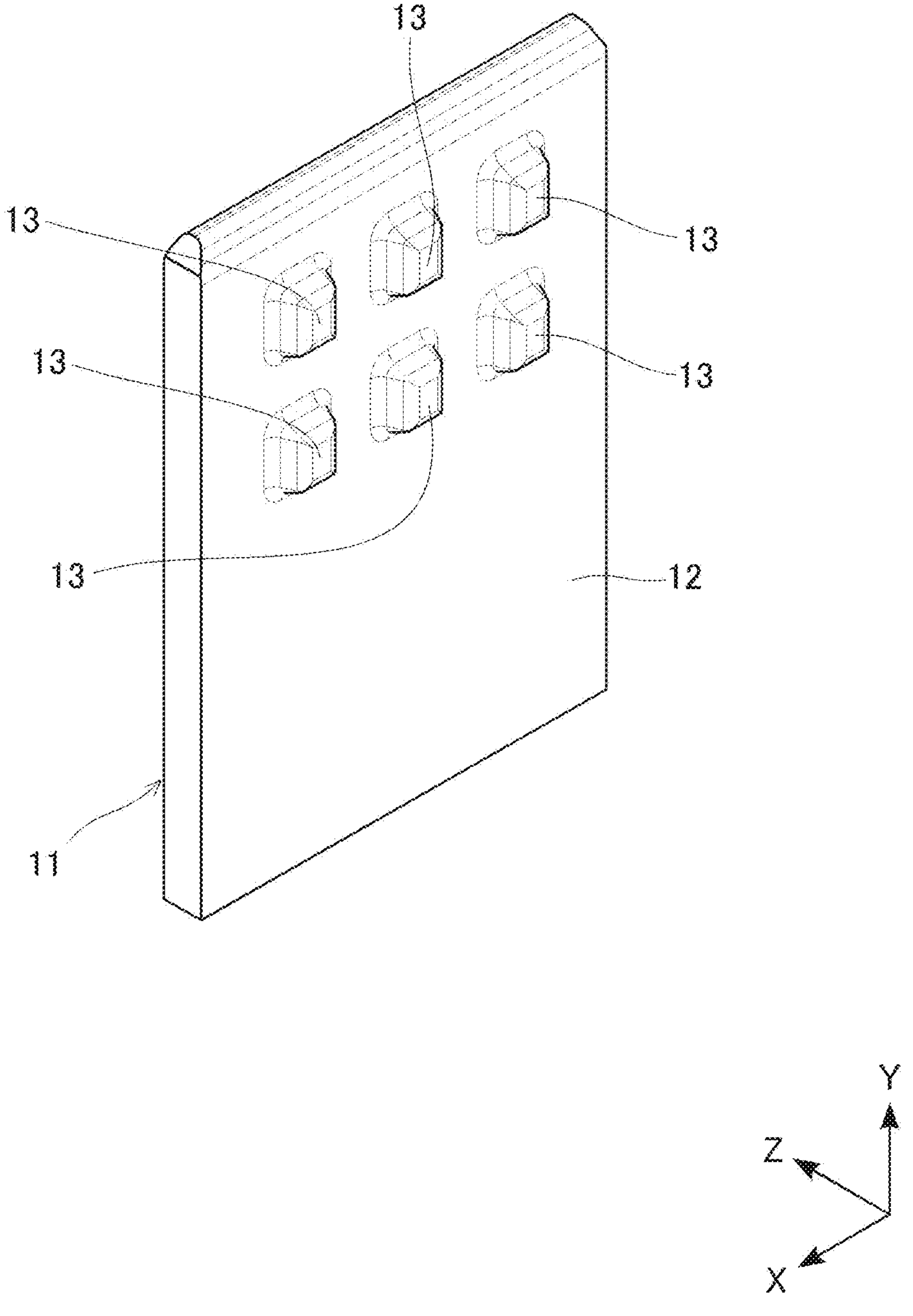
FIG. 5 is an external perspective view of a first terminal according to the first embodiment, seen from the back upper right.

The first terminal 11 is a member made of a conductive metal. As illustrated in FIG. 5, the rear surface side of the first terminal 11 in the first embodiment is a first terminal side assembly surface 12 in a flat-plate shape. In addition, the first terminal 11 has six projection contacts 13 projecting backward (−Z direction), which is the third direction orthogonal to the first terminal side assembly surface 12 (a surface parallel to an XY plane formed of the first direction and the second direction) in which the second terminal 21, which will be described below, is to be assembled.

Figure 6:
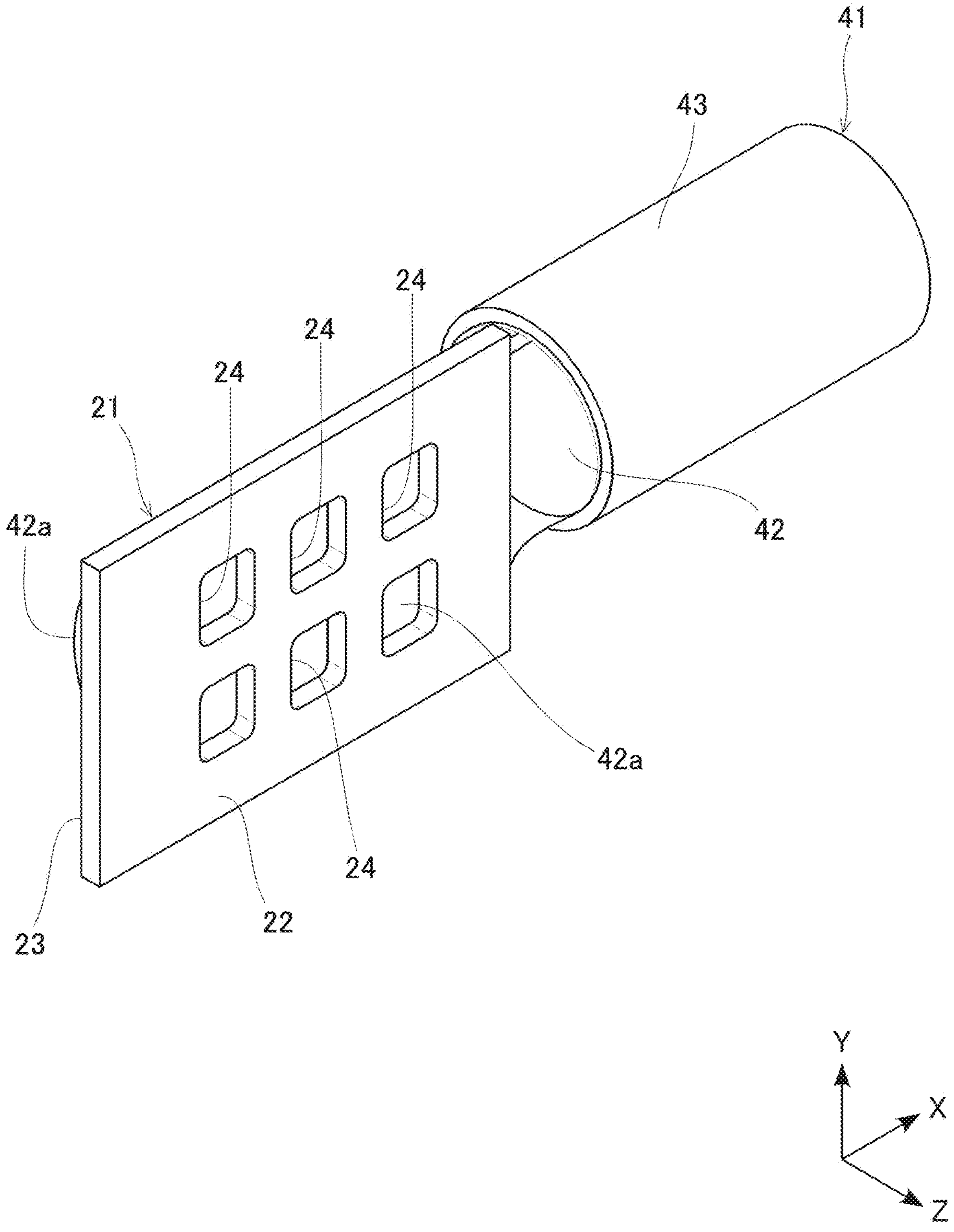
FIG. 6 is an external perspective view of a second terminal according to the first embodiment, seen from the front upper left.
Figure 7:
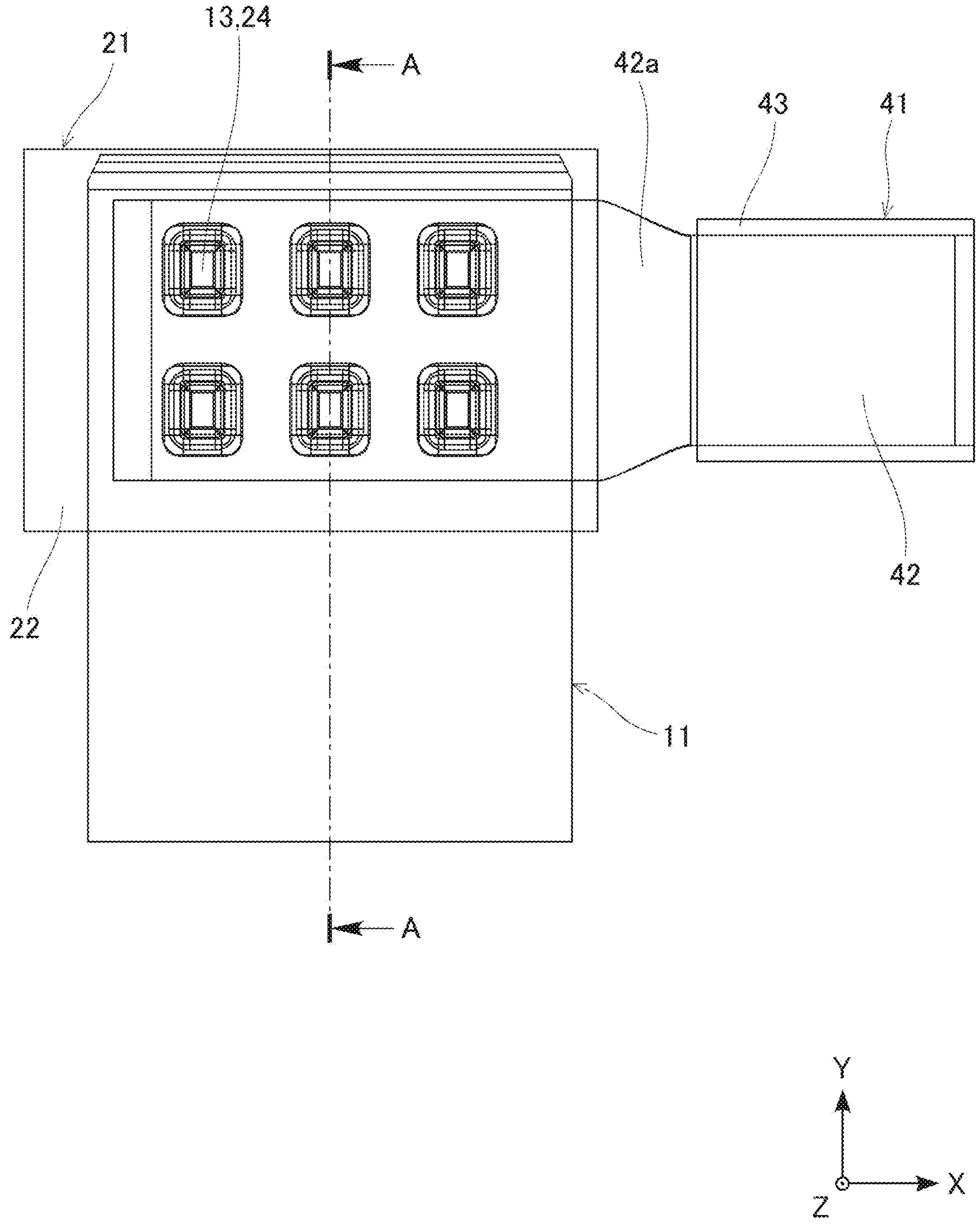
FIG. 7 is a transparent front view for describing a connection state of the first terminal and the second terminal according to the first embodiment.

The second terminal 21 is a member made of a conductive metal. As illustrated in FIG. 6, the front surface side of the second terminal 21 in the first embodiment is a second terminal side assembly surface 22 in a flat-plate shape, and the rear surface side thereof is a twisted wire attachment surface 23 in a flat-plate shape. The front surface and the rear surface of the second terminal 21, where the second terminal side assembly surface 22 and the twisted wire attachment surface 23 are formed, are arranged such that those surfaces are superposed when seen in the Z direction, which is the front and back direction. In addition, the second terminal side assembly surface 22 is a portion that is arranged opposingly to the first terminal side assembly surface 12 possessed by the first terminal 11, when the first terminal 11 and the second terminal 21 are assembled. Furthermore, the second terminal 21 is formed to have six through holes 24 penetrating in the Z direction, which is the front and back direction, from the second terminal side assembly surface 22 on the front surface side in which the first terminal 11 is to be assembled, toward the twisted wire attachment surface 23 on the rear surface side. These six through holes 24 are portions into which the six projection contacts 13 possessed by the first terminal 11 are inserted, when the first terminal 11 and the second terminal 21 are assembled.

On the other hand, an electric wire 41, which is electrically conductive, is connected with the twisted wire attachment surface 23. A twisted wire 42 formed by twisting multiple copper wires having conductivity is arranged inside the electric wire 41 of the first embodiment, and an insulator 43 as a protection member covers an outer circumference of this twisted wire 42. Furthermore, the insulator 43 is removed from an end part of the electric wire 41 that is on the side connected with the twisted wire attachment surface 23, and the twisted wire 42 is exposed, thereby forming an electric wire end 42*a*.

In the first embodiment, the twisted wire attachment surface 23 of the second terminal 21 and the electric wire end 42*a* of the electric wire 41 are connected by adhesion. At this time, since the electric wire end 42*a* is adhered so as to cover the top surface of the twisted wire attachment surface 23 (the back surface of the second terminal 21), the penetrating six through holes 24 formed in the second terminal 21 are blocked by the electric wire end 42*a*. Accordingly, as illustrated in FIG. 6, the second terminal 21 is formed such that, when the six through holes 24 formed in the second terminal 21 are seen from the front surface side, the electric wire end 42*a* can be visually observed through the through holes 24.

Figure 8:
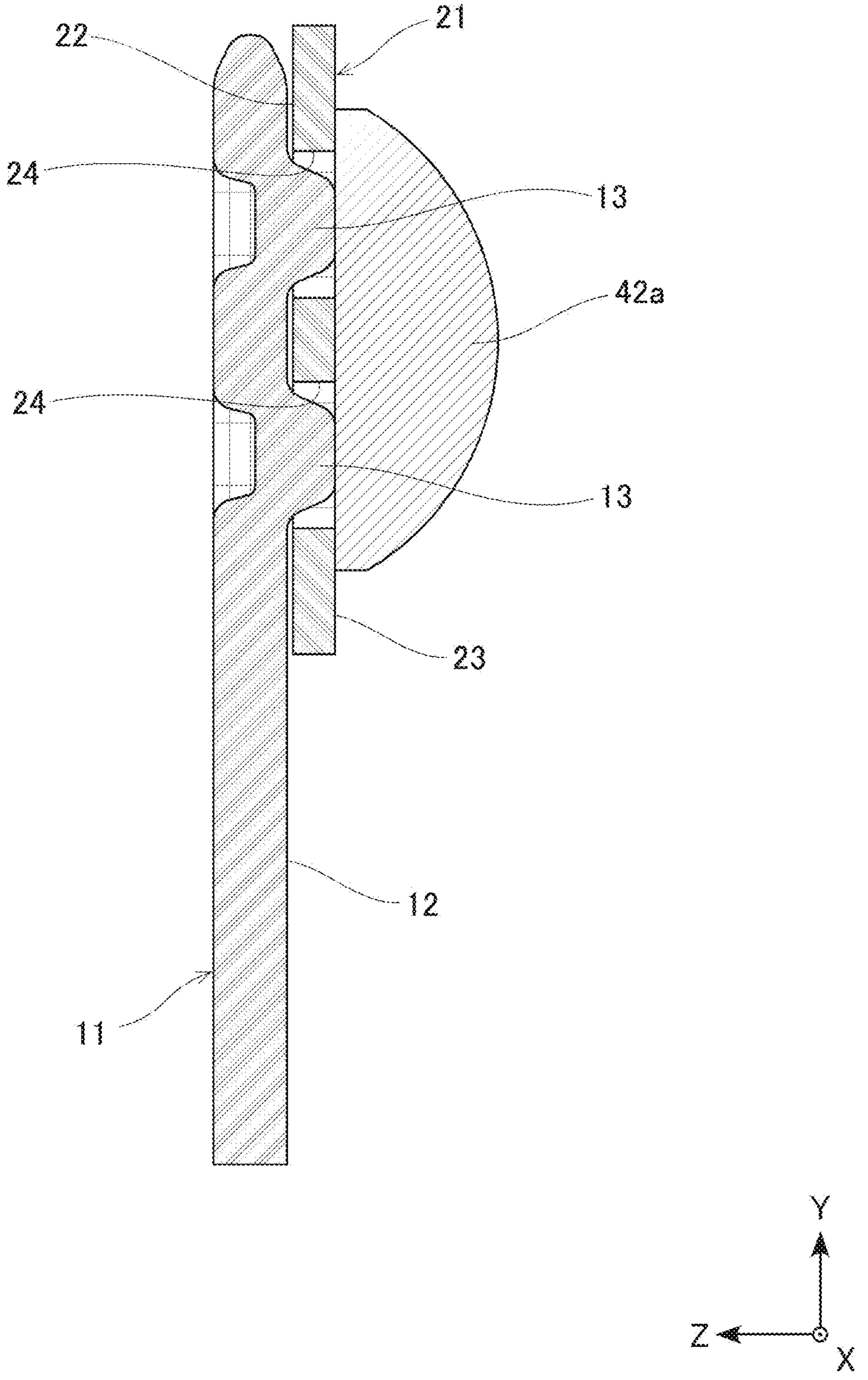
FIG. 8 is a cross-sectional view illustrating an A-A line cross section in FIG. 7.

Thus, when assembling the first terminal 11 and the second terminal 21, once each of the six projection contacts 13 possessed by the first terminal 11 is inserted into the six through holes 24, as illustrated in FIG. 8, the six projection contacts 13 directly contact the electric wire end 42*a*. In addition, at this time, since a height dimension of the six projection contacts 13 is formed to be a dimension greater than a depth dimension of the six through holes 24, the first terminal 11 and the second terminal 21 that are assembled are in a state where only the six projection contacts 13 are in direct contact with the electric wire end 42*a*. Accordingly, since electricity to be transmitted using the electric wire 41 can be electrically conducted and transmitted directly from the electric wire end 42*a* of the twisted wire 42 to the first terminal 11, it is possible to achieve the terminal unit 10 in which electric resistance is small and heat generation is little even if large electric current is applied.

In addition, since the electric wire end 42*a* in direct contact with the six projection contacts 13 is the twisted wire 42 having flexibility, when the first terminal 11 and the second terminal 21 are assembled and brought into contact with each other, the projection contacts 13 of the first terminal 11 dig into the electric wire end 42*a* which is the twisted wire 42. With such configuration, a difference in heights of the six projection contacts 13 and an error at the time of assembly can be absorbed. Thus, since contact resistance can be reduced by multi-point contact, and rise in temperature can be suppressed when applying large electric current, it is possible to apply larger electric current.

Furthermore, in the first embodiment, the six projection contacts 13 possessed by the first terminal 11 are in a projected shape of a quadrilateral. On the other hand, the six through holes 24 possessed by the second terminal 21 are in a quadrilateral penetrating shape corresponding to the quadrilateral of the projection contacts 13. Thus, at the time of assembly of the first terminal 11 and the second terminal 21, even if the terminals move due to vibration or the like, by fitting of projections and recesses using the projection contacts 13 and the through holes 24 both in quadrilateral shapes, fitting parts two-dimensionally work so as to inhibit such movement. Therefore, it becomes possible to suitably suppress wear of parts in direct contact with each other.

Furthermore, regarding the second terminal 21 of the first embodiment, the front surface and the rear surface of the second terminal 21, where the second terminal side assembly surface 22 and the twisted wire attachment surface 23 are formed, are arranged such that those surfaces are superposed when seen in the Z direction, which is the front and back direction. Thus, as compared to the conventional art, the second terminal 21 can have a compact configuration. Accordingly, the terminal unit 10 according to the first embodiment can be miniaturized as compared to the conventional art.

Figure 2:
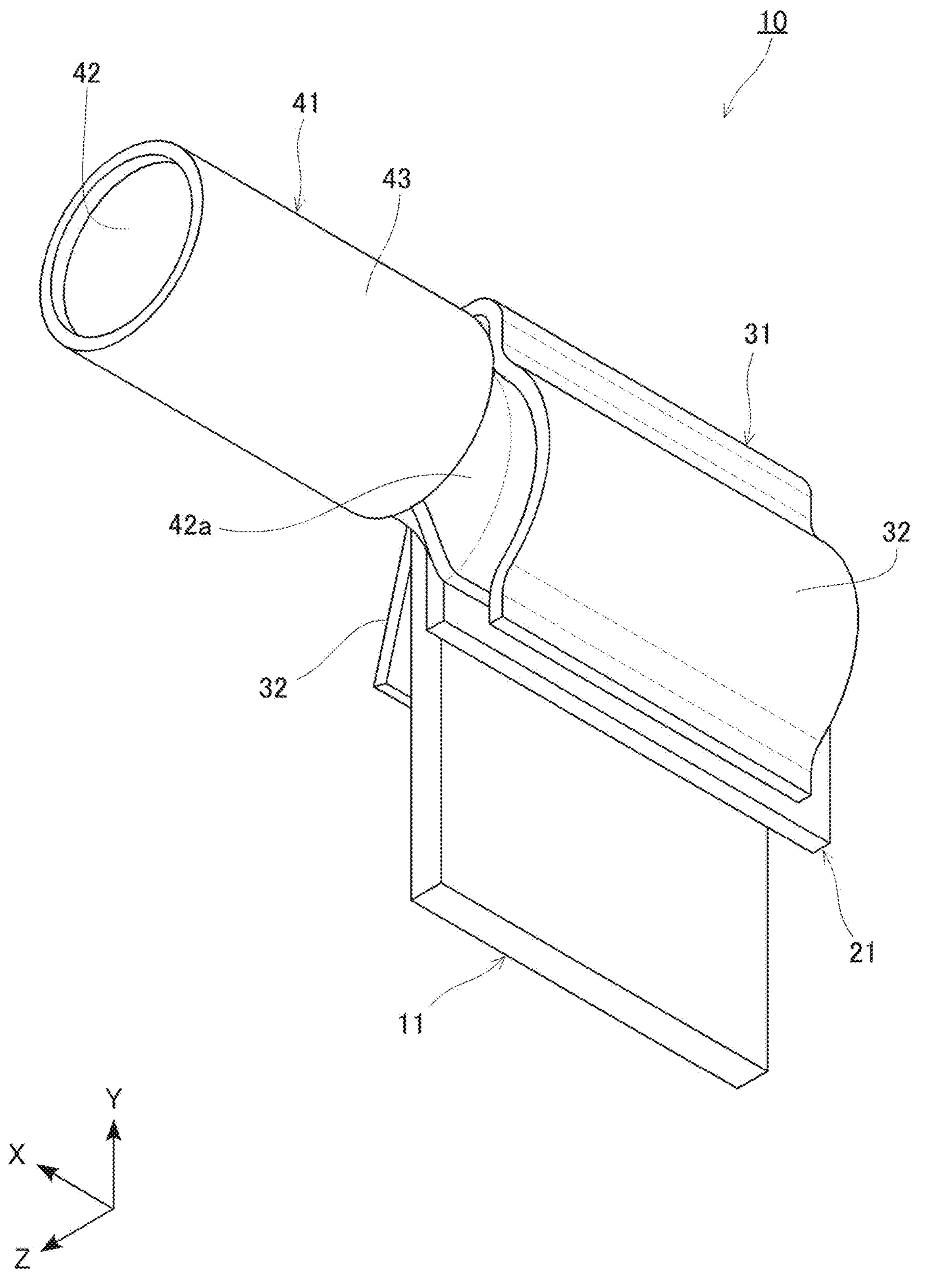
FIG. 2 is an external perspective view of the terminal unit according to the first embodiment, seen from the back lower right.

As illustrated in FIG. 1 and FIG. 2, the first terminal 11 and the second terminal 21 described above can retain a state where the terminals are connected with each other by the pressing member 31. This pressing member 31 is a member in a clip shape which is formed to have two plate-like elastic parts 32 capable of exerting elastic force as pressing force against the front surface and the back surface of the pressing member 31. Furthermore, regarding this pressing member 31, by assembling the first terminal side assembly surface 12 of the first terminal 11 and the second terminal side assembly surface 22 of the second terminal 21 in a state where those surfaces oppose each other, the two plate-like elastic parts 32 exert elastic force which presses the first terminal 11 and the second terminal 21 against each other such that the first terminal 11 and the second terminal 21 can be connected with each other and retained. It should be noted that the pressing member of the present invention can be formed of any member as long as it is a member capable of exerting pressing force. For example, a pressing member using fastening power such as a bolt can be employed.

The configurations of the terminal unit 10 according to the first embodiment have been described above. Next, procedures of forming the terminal unit 10 by assembling the first terminal 11, the second terminal 21, and the pressing member 31 will be described.

Figure 3:
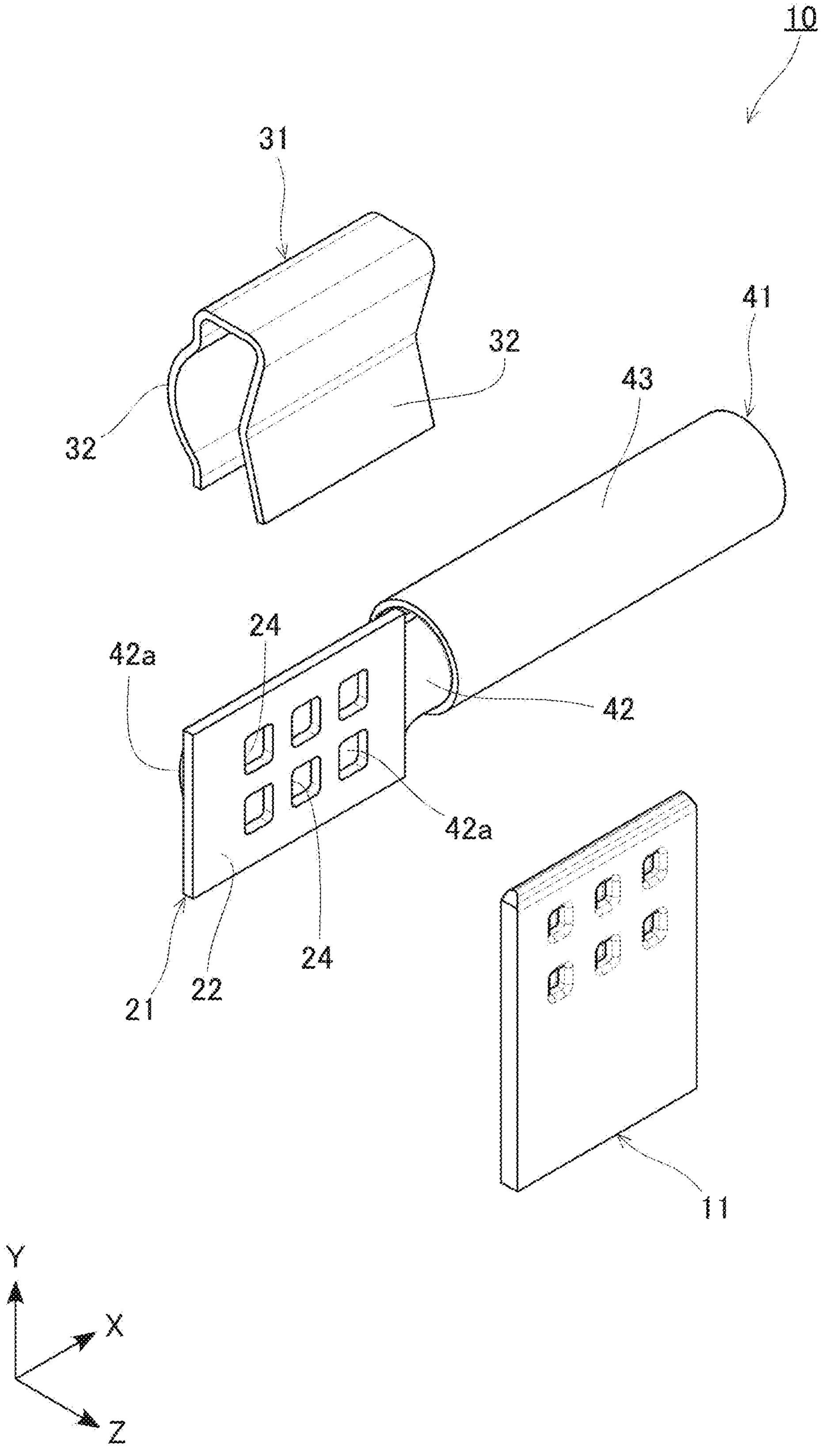
FIG. 3 is an exploded perspective view of the terminal unit according to the first embodiment illustrated in FIG. 1.
Figure 4:
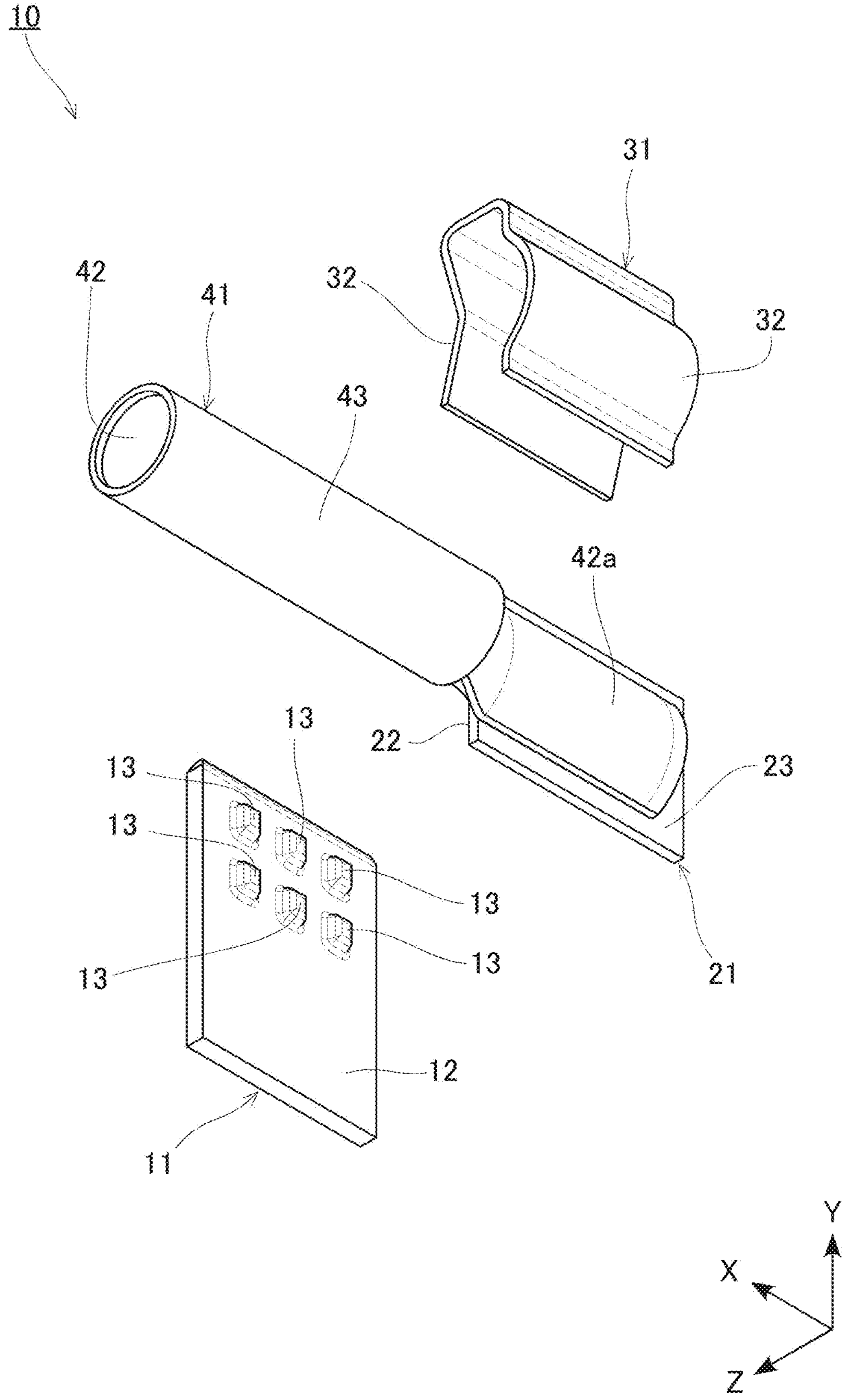
FIG. 4 is an exploded perspective view of the terminal unit according to the first embodiment illustrated in FIG. 2.

The procedures of forming the terminal unit 10 by assembling the first terminal 11, the second terminal 21, and the pressing member 31 will be described by referring to FIG. 3, for example. Firstly, the first terminal side assembly surface 12 of the first terminal 11 is moved in a backward direction (−Z direction) toward the second terminal side assembly surface 22 of the second terminal 21, and the six projection contacts 13 possessed by the first terminal 11 are fitted into the six through holes 24 possessed by the second terminal 21. From this state, the pressing member 31 is moved in a downward direction (−Y direction) to sandwich the first terminal 11 and the second terminal 21 with the two plate-like elastic parts 32, thereby achieving the state illustrated in FIG. 1. In such state, with pressing force consisting of elastic force exerted from the two plate-like elastic parts 32 possessed by the pressing member 31, assembly of the first terminal 11 and the second terminal 21 is completed in a state where the first terminal side assembly surface 12 of the first terminal 11 and the second terminal side assembly surface 22 of the second terminal 21 oppose each other. It should be noted that, as illustrated in FIG. 8, since the six projection contacts 13 directly contact the electric wire end 42*a* in the first terminal 11 and the second terminal 21, the terminal unit 10 having an extremely short electric conduction path is achieved. Accordingly, with the terminal unit 10 according to the first embodiment, electric resistance can be made small, and heat generation can be made little even if large electric current is applied.

The configurations and the assembly procedures of the terminal unit 10 according to the first embodiment have been described above by using FIG. 1 to FIG. 8. However, the technical scope of the present invention is not limited to the scope described in the above-described embodiment. Various alterations or improvements can be added to the above-described embodiment.

For example, the above-mentioned first embodiment exemplified a case in which the twisted wire attachment surface 23 of the second terminal 21 and the electric wire end 42*a* of the electric wire 41 are connected by adhesion. However, besides a means of bonding the twisted wire attachment surface 23 of the second terminal 21 and the electric wire end 42*a* of the electric wire 41 in a molecular level by heat, various connection means included in the definition of adhesion such as soldering or welding can be used for adhesion as this connection means.

In addition, as illustrated in FIG. 6, the second terminal 21 in the above-mentioned first embodiment is formed such that, when the six through holes 24 formed in the second terminal 21 are seen from the front surface side, the electric wire end 42*a* can be visually observed through the through holes 24. The electric wire end 42*a* which can be visually observed through the through holes 24 is in a state where the twisted wire 42 is exposed. For the electric wire end 42*a* made of the twisted wire 42 in such exposed state, the top surface of the twisted wire 42 which can be visually observed can be protected by applying a surface treatment such as silver plating. Although the flexibility of the twisted wire 42 slightly worsens by applying the surface treatment such as silver plating, since oxidation of the top surface of the copper wire can be suppressed, an effect of reducing contact resistance can be obtained over a long period of time. The terminal unit to which such improvement configuration is added is also included in the present invention.

Preferable embodiments of the present invention have been described above. Next, a second embodiment to which the present invention is applicable will be described by using FIG. 9 to FIG. 16. It should be noted that, in the following descriptions, members that are the same as or similar to the members described in the above-mentioned first embodiment may be denoted by the same reference signs, and descriptions thereof may be omitted.

Second Embodiment

The terminal unit 10 according to the second embodiment will be described by using FIG. 9 to FIG. 16.

As illustrated in FIG. 9 to FIG. 12, the terminal unit 10 according to the second embodiment includes the first terminal 11, the second terminal 21, and the pressing member 31.

Figure 13:
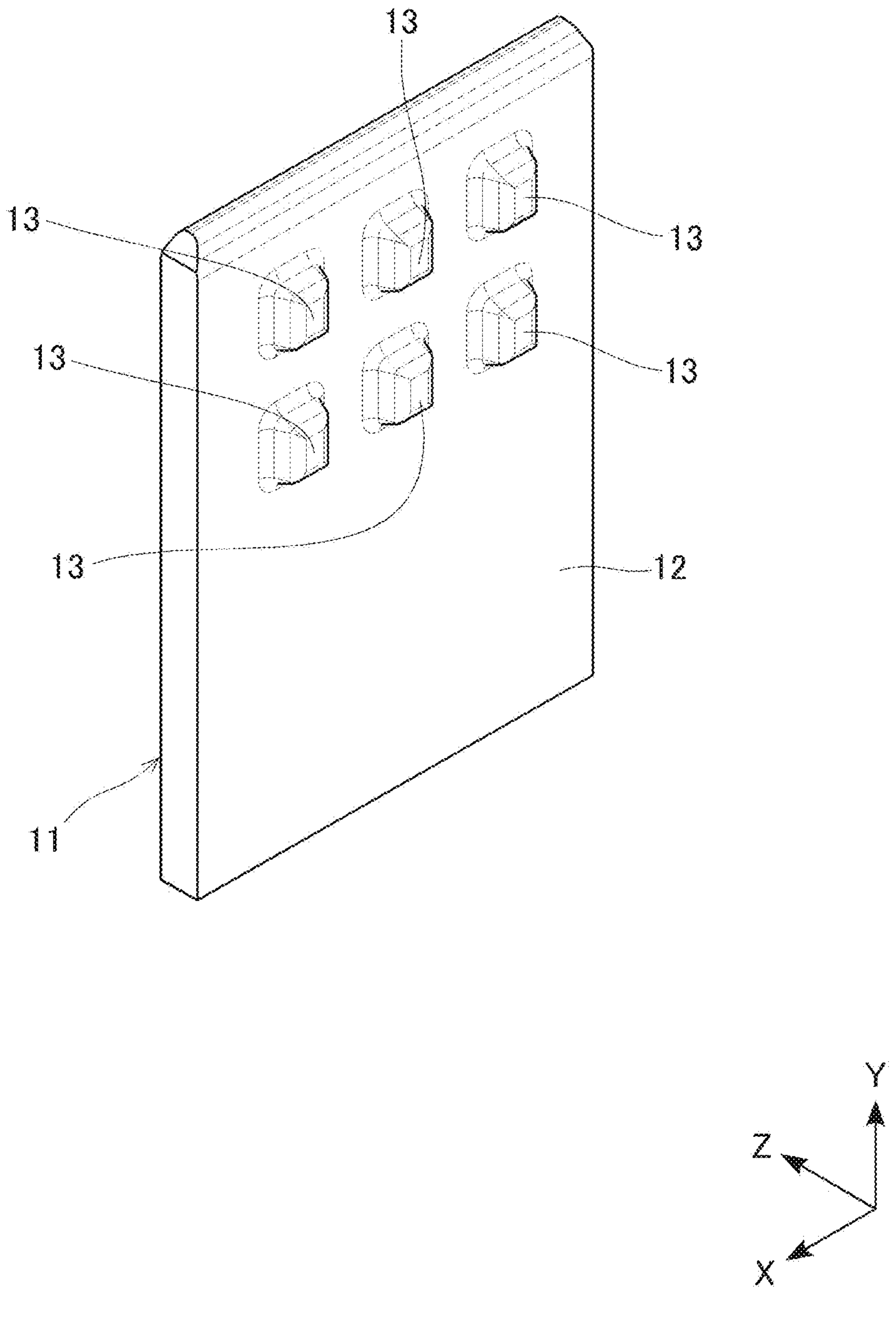
FIG. 13 is an external perspective view of a first terminal according to the second embodiment, seen from the back upper right.

The first terminal 11 is a member made of a conductive metal. As illustrated in FIG. 13, the rear surface side of the first terminal 11 in the second embodiment is the first terminal side assembly surface 12 in a flat-plate shape. In addition, the first terminal 11 has the six projection contacts 13 projecting backward (−Z direction), which is the third direction orthogonal to the first terminal side assembly surface 12 (the surface parallel to the XY plane formed of the first direction and the second direction) in which the second terminal 21, which will be described below, is to be assembled.

Figure 14:
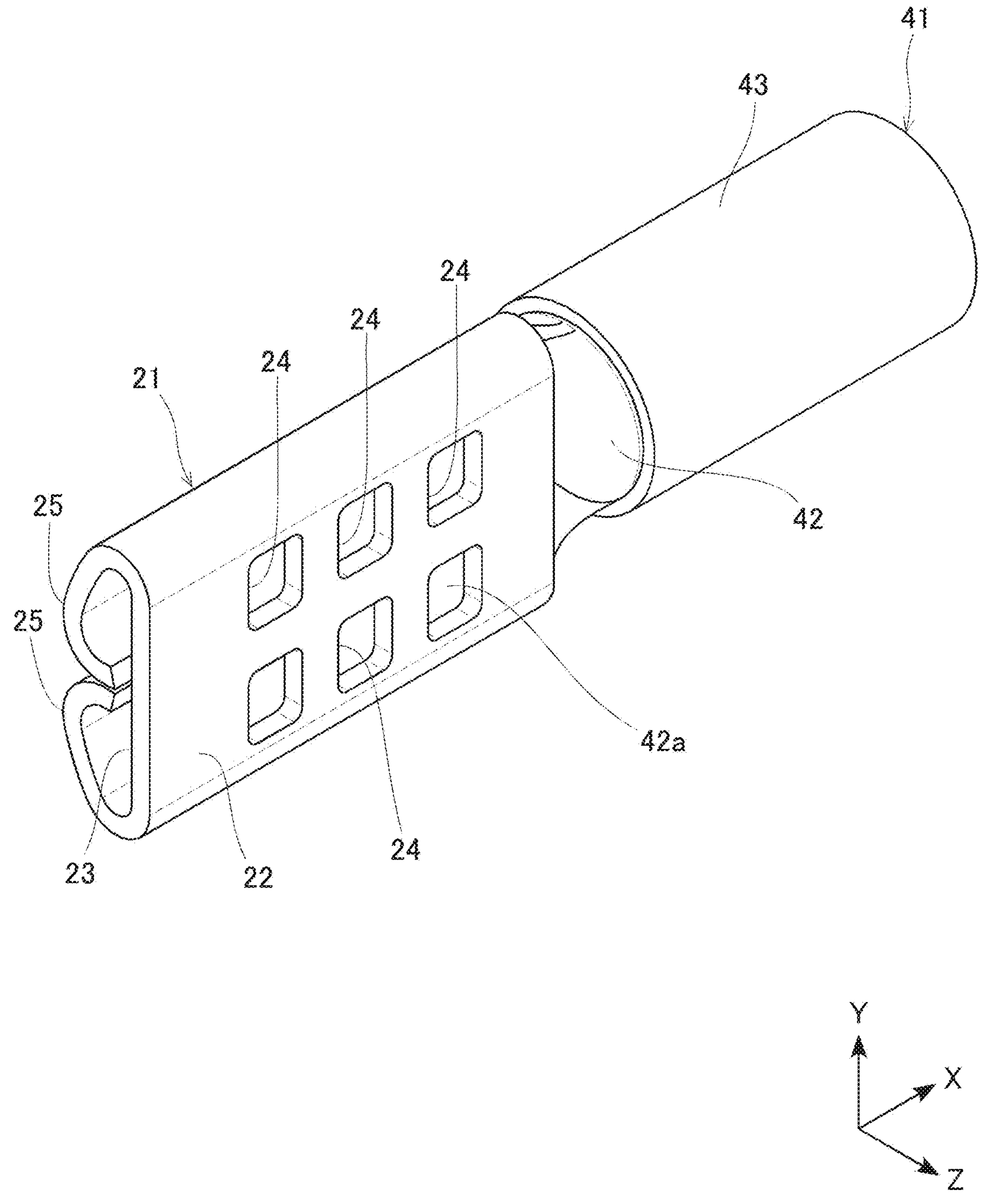
FIG. 14 is an external perspective view of a second terminal according to the second embodiment, seen from the front upper left.
Figure 15:
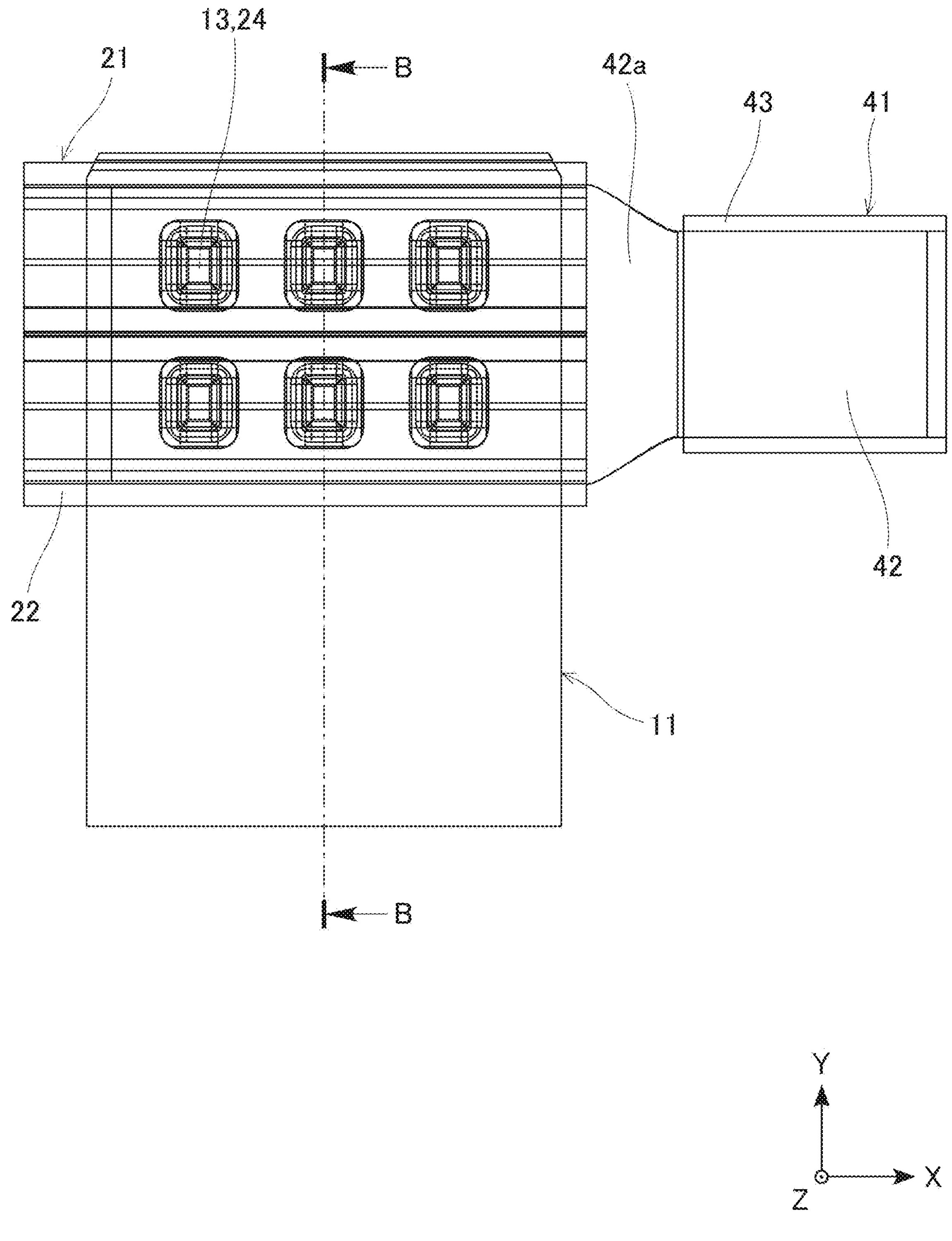
FIG. 15 is a transparent front view for describing a connection state of the first terminal and the second terminal according to the second embodiment.

The second terminal 21 is a member made of a conductive metal. As illustrated in FIG. 14, the front surface side of the second terminal 21 in the second embodiment is the second terminal side assembly surface 22 in a flat-plate shape, and the rear surface side of this second terminal side assembly surface 22 is the twisted wire attachment surface 23 in a flat-plate shape. The front surface and the rear surface of the second terminal 21, where the second terminal side assembly surface 22 and the twisted wire attachment surface 23 are formed, are arranged such that those surfaces are superposed when seen in the Z direction, which is the front and back direction. In addition, the second terminal side assembly surface 22 is a portion that is arranged opposingly to the first terminal side assembly surface 12 possessed by the first terminal 11, when the first terminal 11 and the second terminal 21 are assembled. Furthermore, the second terminal 21 is formed to have the six through holes 24 penetrating in the Z direction, which is the front and back direction, from the second terminal side assembly surface 22 on the front surface side in which the first terminal 11 is to be assembled, toward the twisted wire attachment surface 23 on the rear surface side. These six through holes 24 are portions into which the six projection contacts 13 possessed by the first terminal 11 are inserted, when the first terminal 11 and the second terminal 21 are assembled.

On the other hand, the electric wire 41, which is electrically conductive, is connected with the twisted wire attachment surface 23. The twisted wire 42 formed by twisting multiple copper wires having conductivity is arranged inside the electric wire 41 of the second embodiment, and the insulator 43 as a protection member covers an outer circumference of this twisted wire 42. Furthermore, the insulator 43 is removed from an end part of the electric wire 41 that is on the side connected with the twisted wire attachment surface 23, and the twisted wire 42 is exposed, thereby forming the electric wire end 42*a*.

In the second embodiment, the twisted wire attachment surface 23 of the second terminal 21 and the electric wire end 42*a* of the electric wire 41 are connected by pressure bonding. More specifically, in the second terminal 21, a swaging wall surface part 25 is formed so as to extend toward the upside and the downside of the second terminal side assembly surface 22 on the front surface side and the twisted wire attachment surface 23 on the rear surface side. This swaging wall surface part 25 is subjected to a swaging process and is bent so as to enclose the electric wire end 42*a*, such that the electric wire end 42*a* is pressure-bonded so as to cover the top surface of the twisted wire attachment surface 23 (the back surface of the second terminal 21). Accordingly, the penetrating six through holes 24 formed in the second terminal 21 are blocked by the electric wire end 42*a*. In other words, as illustrated in FIG. 14, the second terminal 21 is formed such that, when the six through holes 24 formed in the second terminal 21 are seen from the front surface side, the electric wire end 42*a* can be visually observed through the through holes 24.

Figure 16:
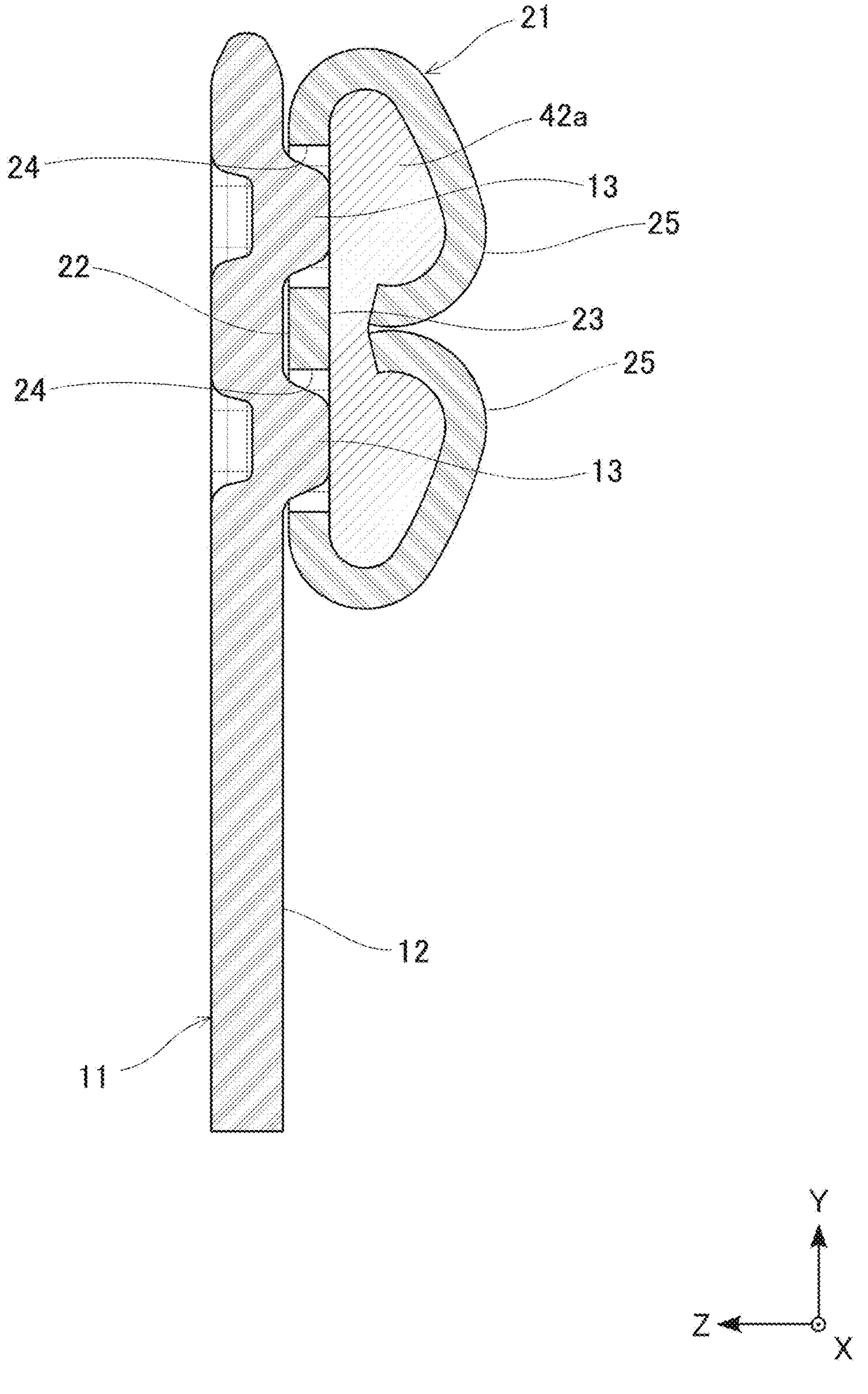
FIG. 16 is a cross-sectional view illustrating a B-B line cross section in FIG. 15.
Figure 17:
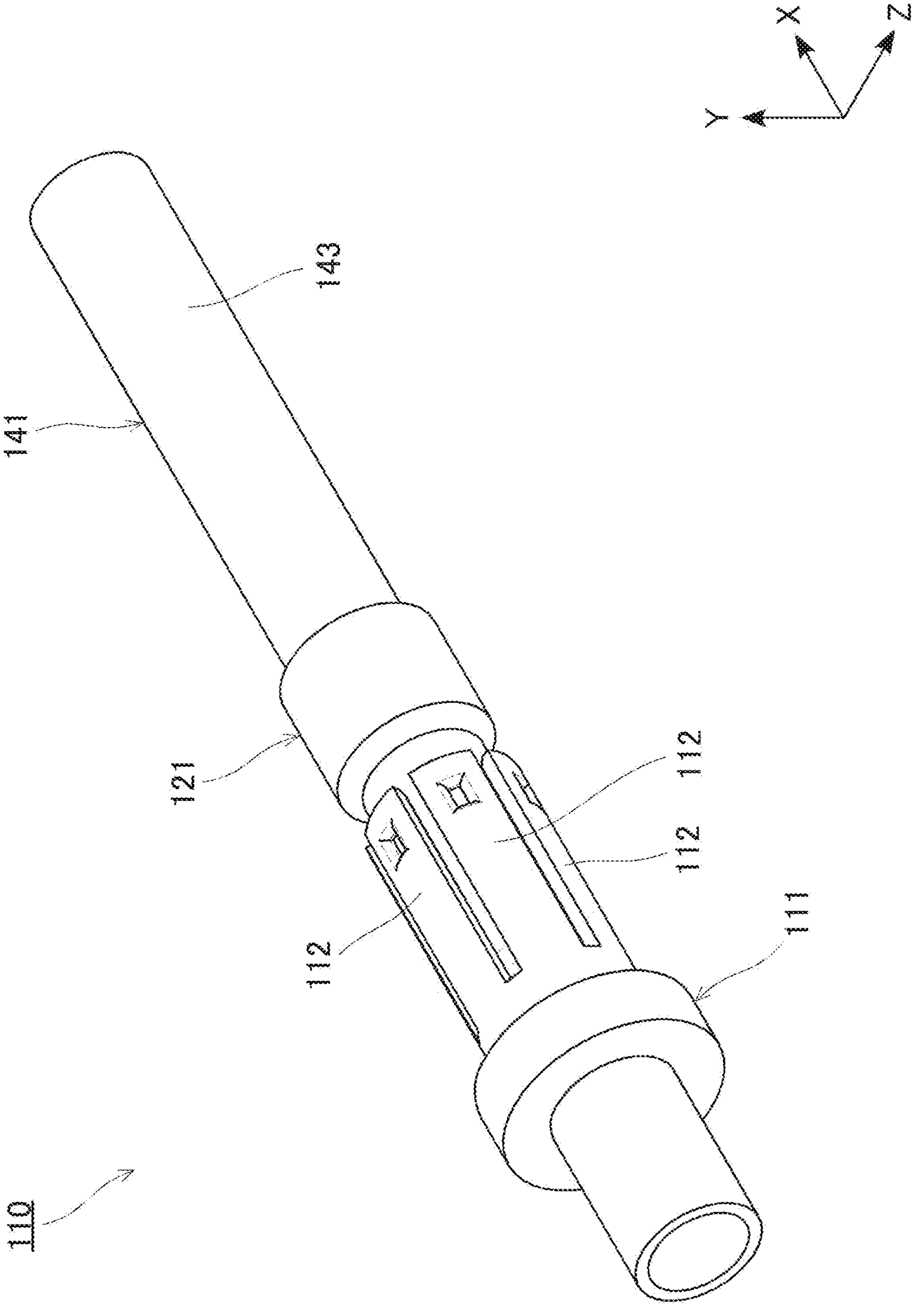
FIG. 17 is an external perspective view of a terminal unit according to a third embodiment, seen from the front upper left.
Figure 18:
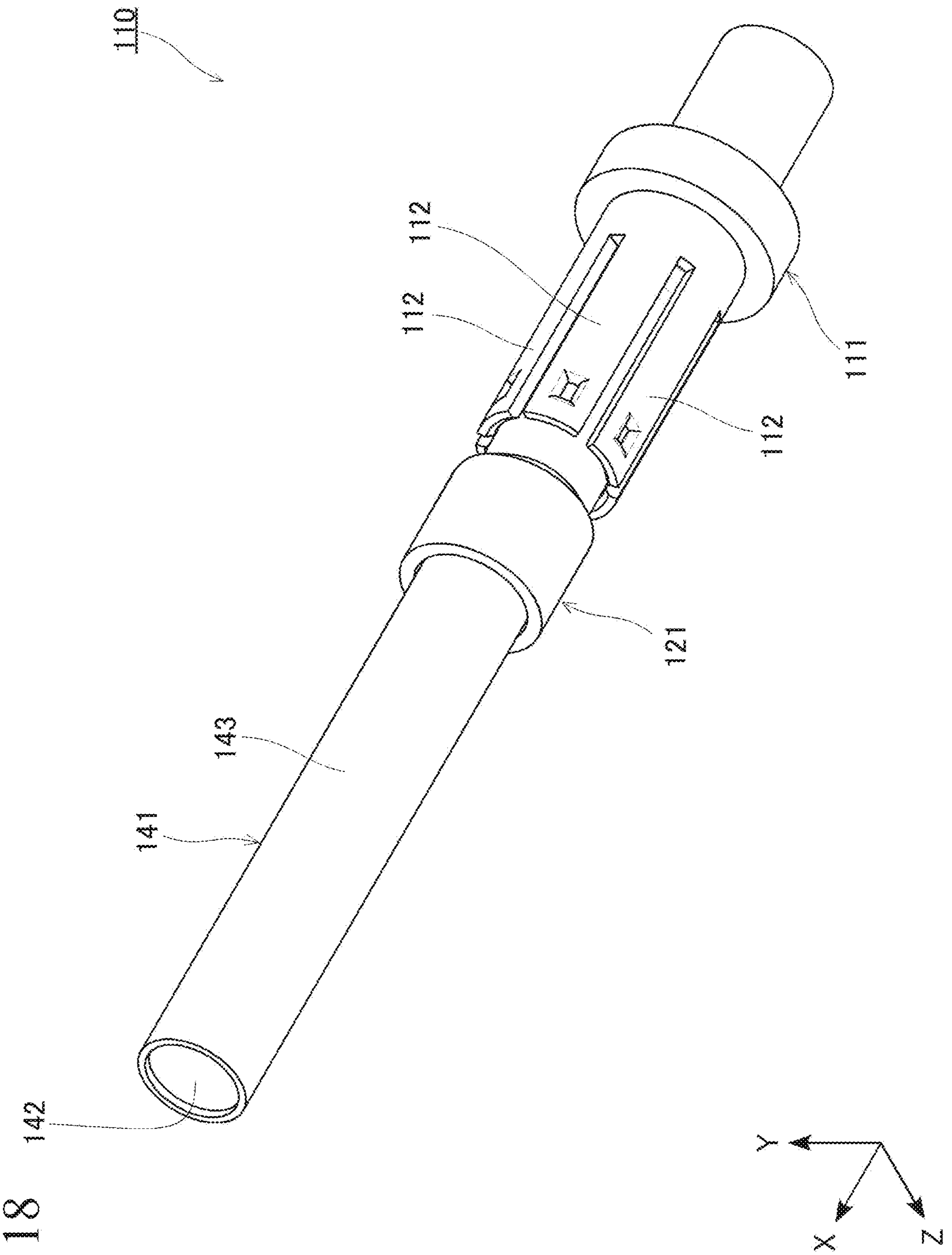
FIG. 18 is an external perspective view of the terminal unit according to the third embodiment, seen from the back lower right.
Figure 19:
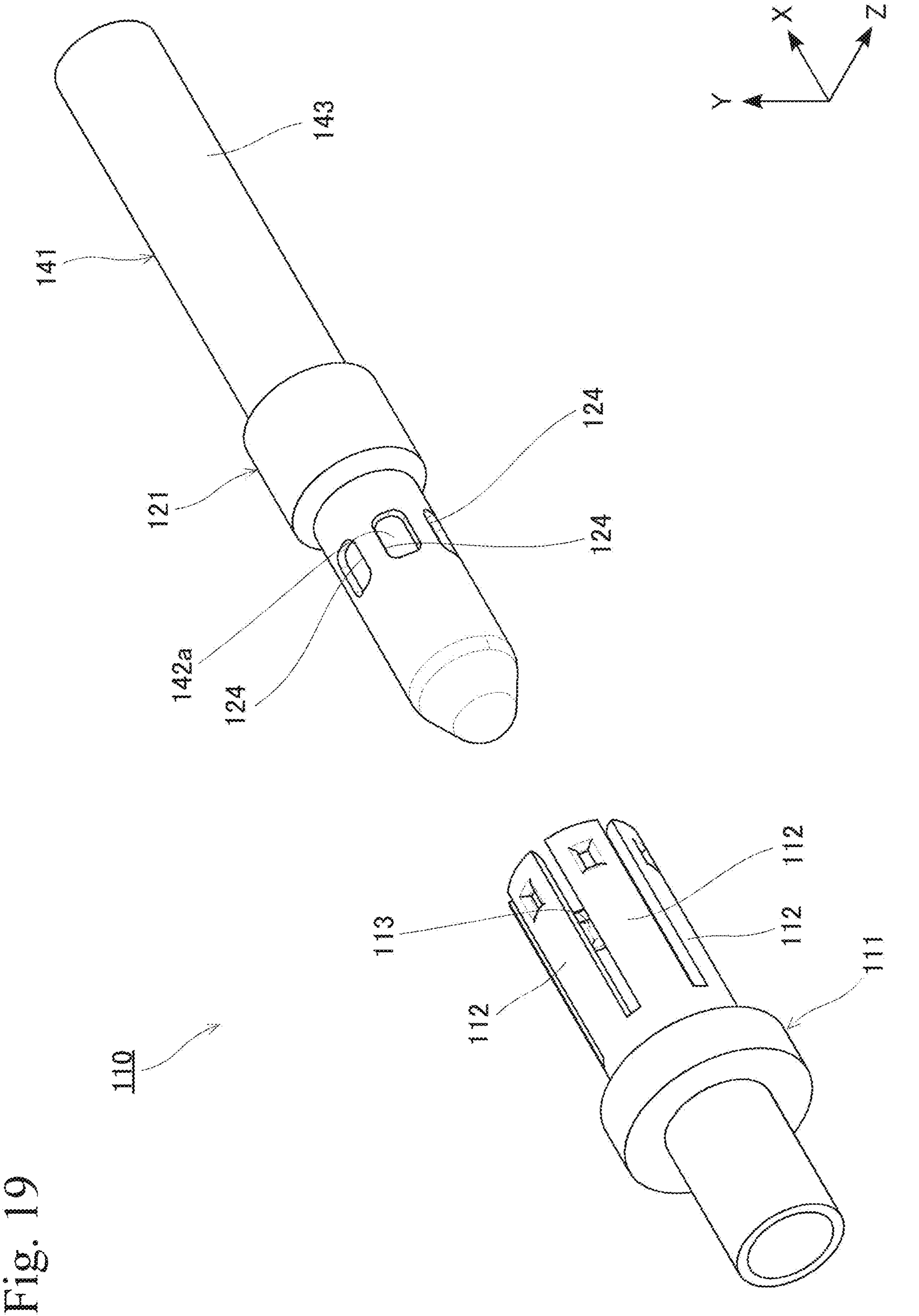
FIG. 19 is an exploded perspective view of the terminal unit according to the third embodiment illustrated in FIG. 17.

Thus, when assembling the first terminal 11 and the second terminal 21, once each of the six projection contacts 13 possessed by the first terminal 11 is inserted into the six through holes 24, as illustrated in FIG. 16, the six projection contacts 13 directly contact the electric wire end 42*a*. In addition, at this time, since a height dimension of the six projection contacts 13 is formed to be a dimension greater than a depth dimension of the six through holes 24, the first terminal 11 and the second terminal 21 that are assembled are in a state where only the six projection contacts 13 and the electric wire end 42*a* are in direct contact therebetween. Accordingly, since electricity to be transmitted using the electric wire 41 can be electrically conducted and transmitted directly from the electric wire end 42*a* of the twisted wire 42 to the first terminal 11, it is possible to achieve the terminal unit 10 in which electric resistance is small and heat generation is little even if large electric current is applied.

In addition, since the electric wire end 42*a* in direct contact with the six projection contacts 13 is the twisted wire 42 having flexibility, when the first terminal 11 and the second terminal 21 are assembled and brought into contact with each other, the projection contacts 13 of the first terminal 11 dig into the electric wire end 42*a* which is the twisted wire 42. With such configuration, a difference in heights of the six projection contacts 13 and an error at the time of assembly can be absorbed. Thus, since contact resistance can be reduced by multi-point contact, and rise in temperature can be suppressed when applying large electric current, it is possible to apply larger electric current.

Furthermore, in the second embodiment, the six projection contacts 13 possessed by the first terminal 11 are in a projected shape of a quadrilateral. On the other hand, the six through holes 24 possessed by the second terminal 21 are in a quadrilateral penetrating shape corresponding to the quadrilateral of the projection contacts 13. Thus, at the time of assembly of the first terminal 11 and the second terminal 21, even if the terminals move due to vibration or the like, by fitting of projections and recesses using the projection contacts 13 and the through holes 24 both in quadrilateral shapes, fitting parts two-dimensionally work so as to inhibit such movement. Therefore, it becomes possible to suitably suppress wear of parts in direct contact with each other.

Furthermore, regarding the second terminal 21 of the second embodiment, the front surface and the rear surface of the second terminal 21, where the second terminal side assembly surface 22 and the twisted wire attachment surface 23 are formed, are arranged such that those surfaces are superposed when seen in the Z direction, which is the front and back direction. Thus, as compared to the conventional art, the second terminal 21 can have a compact configuration. Accordingly, the terminal unit 10 according to the second embodiment can be miniaturized as compared to the conventional art.

Figure 9:
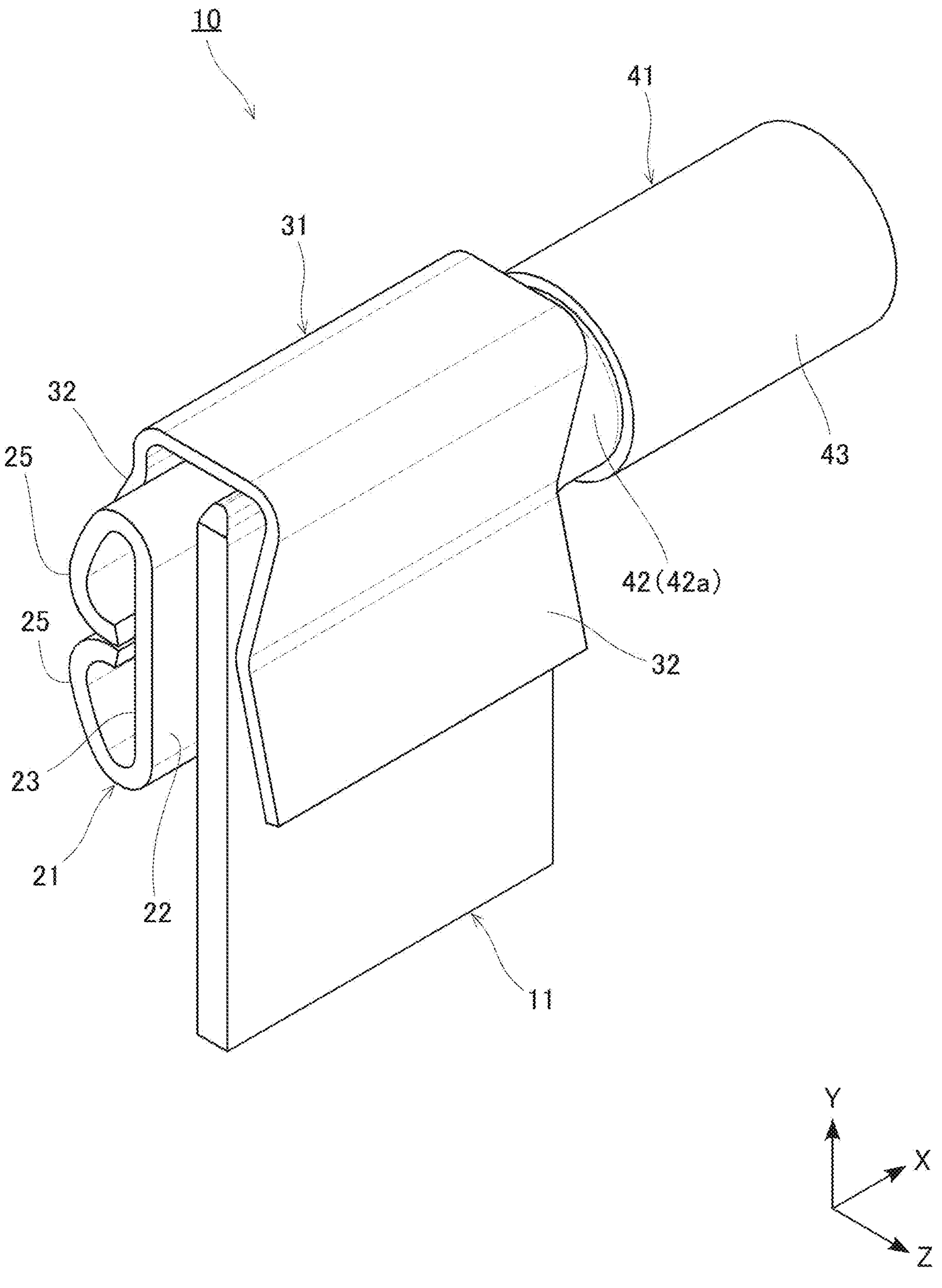
FIG. 9 is an external perspective view of a terminal unit according to a second embodiment, seen from the front upper left.
Figure 10:
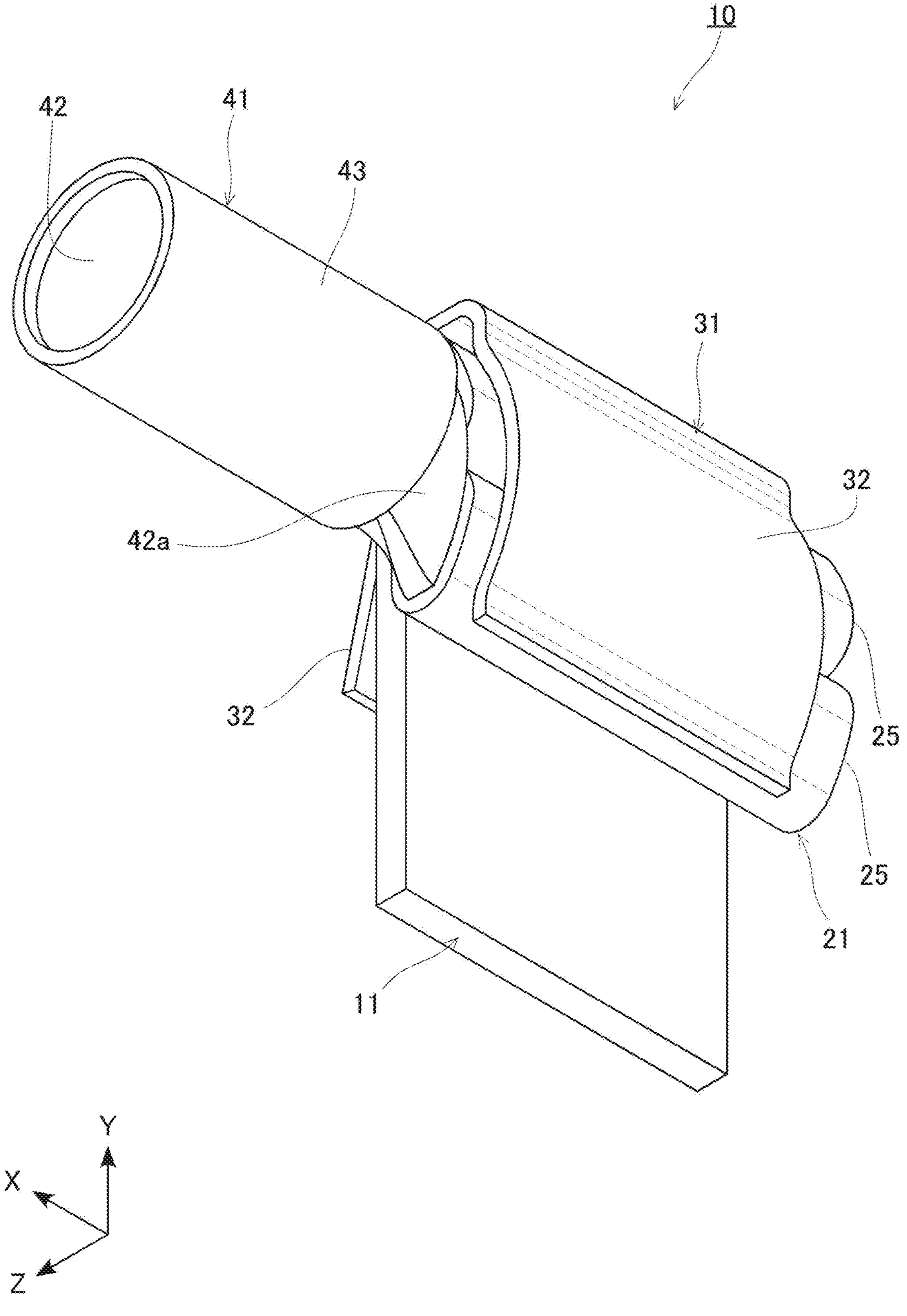
FIG. 10 is an external perspective view of the terminal unit according to the second embodiment, seen from the back lower right.

As illustrated in FIG. 9 and FIG. 10, the first terminal 11 and the second terminal 21 described above can retain a state where the terminals are connected with each other by the pressing member 31. This pressing member 31 is a member in a clip shape which is formed to have the two plate-like elastic parts 32 capable of exerting elastic force as pressing force against the front surface and the back surface of the pressing member 31. Furthermore, regarding this pressing member 31, by assembling the first terminal side assembly surface 12 of the first terminal 11 and the second terminal side assembly surface 22 of the second terminal 21 in a state where those surfaces oppose each other, the two plate-like elastic parts 32 exert elastic force which presses the first terminal 11 and the second terminal 21 against each other such that the first terminal 11 and the second terminal 21 can be connected with each other and retained. It should be noted that the pressing member of the present invention can be formed of any member as long as it is a member capable of exerting pressing force. For example, a pressing member using fastening power such as a bolt can be employed.

The configurations of the terminal unit 10 according to the second embodiment have been described above. Next, procedures of forming the terminal unit 10 by assembling the first terminal 11, the second terminal 21, and the pressing member 31 will be described.

Figure 11:
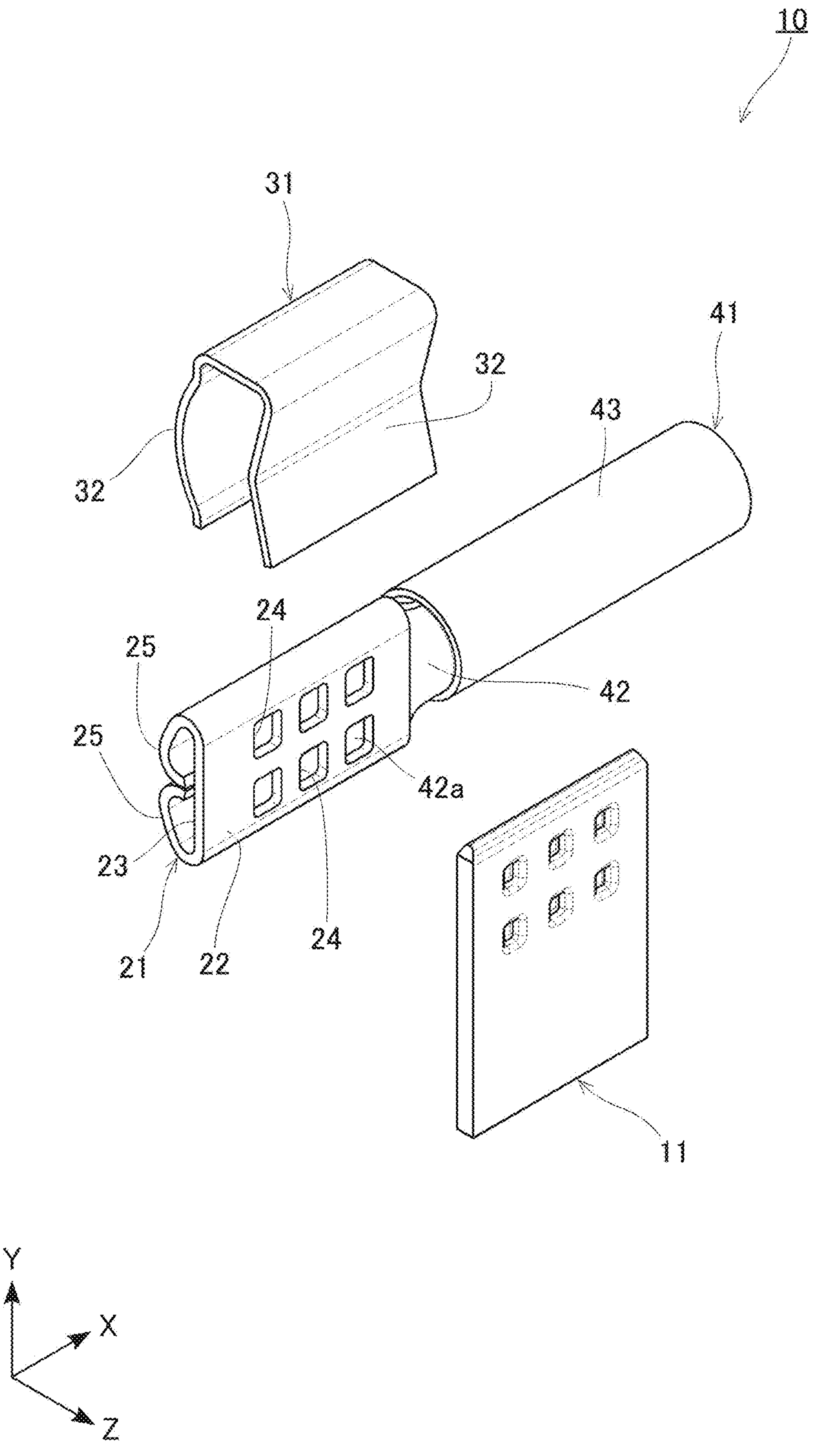
FIG. 11 is an exploded perspective view of the terminal unit according to the second embodiment illustrated in FIG. 9.
Figure 12:
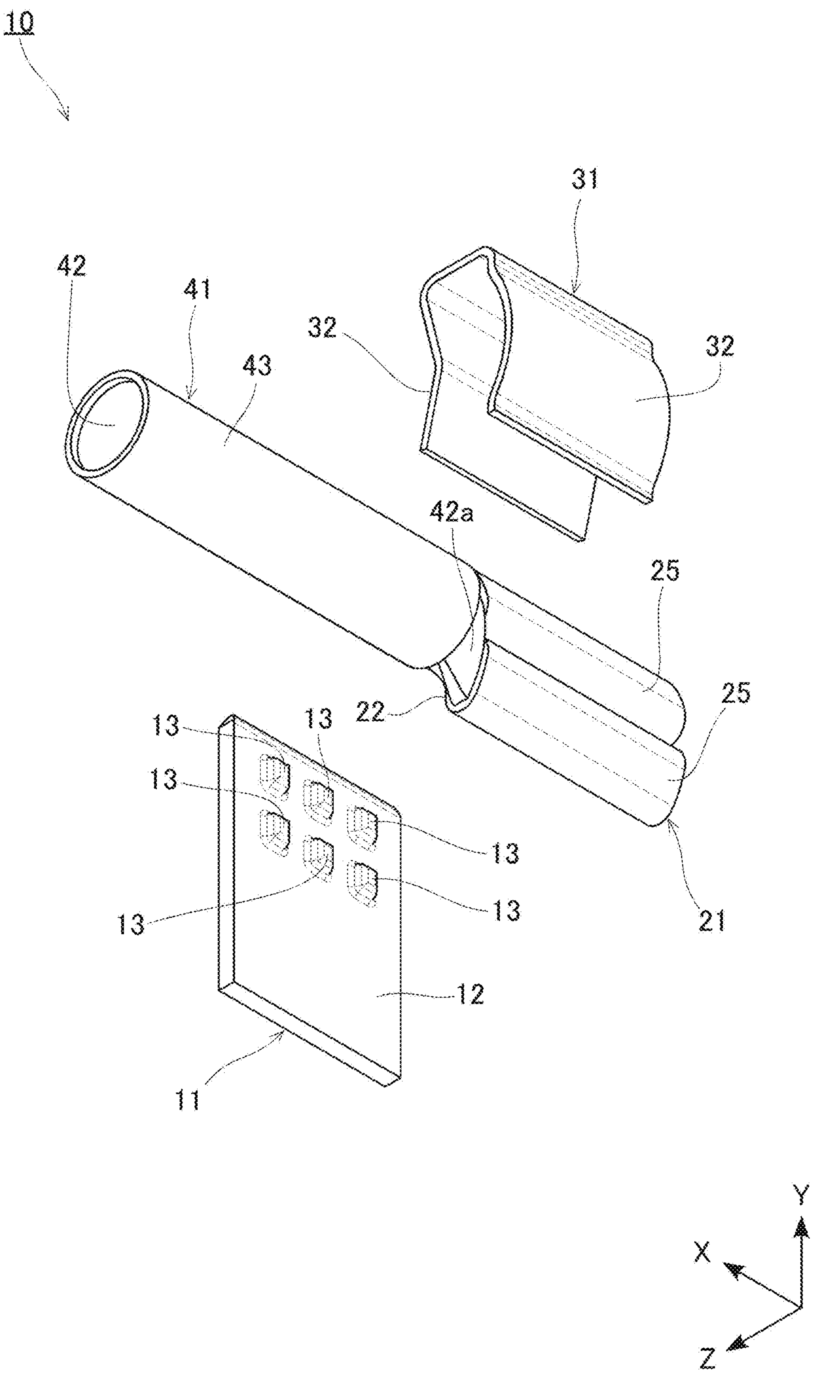
FIG. 12 is an exploded perspective view of the terminal unit according to the second embodiment illustrated in FIG. 10.

The procedures of forming the terminal unit 10 by assembling the first terminal 11, the second terminal 21, and the pressing member 31 will be described by referring to FIG. 11, for example. Firstly, the first terminal side assembly surface 12 of the first terminal 11 is moved in a backward direction (−Z direction) toward the second terminal side assembly surface 22 of the second terminal 21, and the six projection contacts 13 possessed by the first terminal 11 are fitted into the six through holes 24 possessed by the second terminal 21. From this state, the pressing member 31 is moved in a downward direction (−Y direction) to sandwich the first terminal 11 and the second terminal 21 with the two plate-like elastic parts 32, thereby achieving the state illustrated in FIG. 1. In such state, with pressing force consisting of elastic force exerted from the two plate-like elastic parts 32 possessed by the pressing member 31, assembly of the first terminal 11 and the second terminal 21 is completed in a state where the first terminal side assembly surface 12 of the first terminal 11 and the second terminal side assembly surface 22 of the second terminal 21 oppose each other. It should be noted that, as illustrated in FIG. 16, since the six projection contacts 13 directly contact the electric wire end 42*a* in the first terminal 11 and the second terminal 21, the terminal unit 10 having an extremely short electric conduction path is achieved. Accordingly, with the terminal unit 10 according to the second embodiment, electric resistance can be made small, and heat generation can be made little even if large electric current is applied.

The configurations and the assembly procedures of the terminal unit 10 according to the second embodiment have been described above by using FIG. 9 to FIG. 16. However, the technical scope of the present invention is not limited to the scope described in the above-described embodiment. Various alterations or improvements can be added to the above-described embodiment.

For example, the above-mentioned second embodiment exemplified a case in which the twisted wire attachment surface 23 of the second terminal 21 and the electric wire end 42*a* of the electric wire 41 are connected by pressure bonding. However, besides a connection means utilizing plastic deformation of a metal material such as a swaging process, various connection means included in the definition of pressure bonding such as, for example, thermocompression bonding or ultrasonic thermocompression bonding can be used for pressure bonding as this connection means.

In addition, as illustrated in FIG. 14, the second terminal 21 in the above-mentioned second embodiment is formed such that, when the six through holes 24 formed in the second terminal 21 are seen from the front surface side, the electric wire end 42*a* can be visually observed through the through holes 24. The electric wire end 42*a* which can be visually observed through the through holes 24 is in a state where the twisted wire 42 is exposed. For the electric wire end 42*a* made of the twisted wire 42 in such exposed state, the top surface of the twisted wire 42 which can be visually observed can be protected by applying a surface treatment such as silver plating. Although the flexibility of the twisted wire 42 slightly worsens by applying the surface treatment such as silver plating, since oxidation of the top surface of the copper wire can be suppressed, an effect of reducing contact resistance can be obtained over a long period of time. The terminal unit to which such improvement configuration is added is also included in the present invention.

Preferable embodiments of the present invention have been described above. Next, a third embodiment to which the present invention is applicable will be described by using FIG. 17 to FIG. 22.

Third Embodiment

A terminal unit 110 according to the third embodiment will be described by using FIG. 17 to FIG. 22.

As illustrated in FIG. 17 to FIG. 20, the terminal unit 110 according to the third embodiment includes a first terminal 111 and a second terminal 121.

Figure 20:
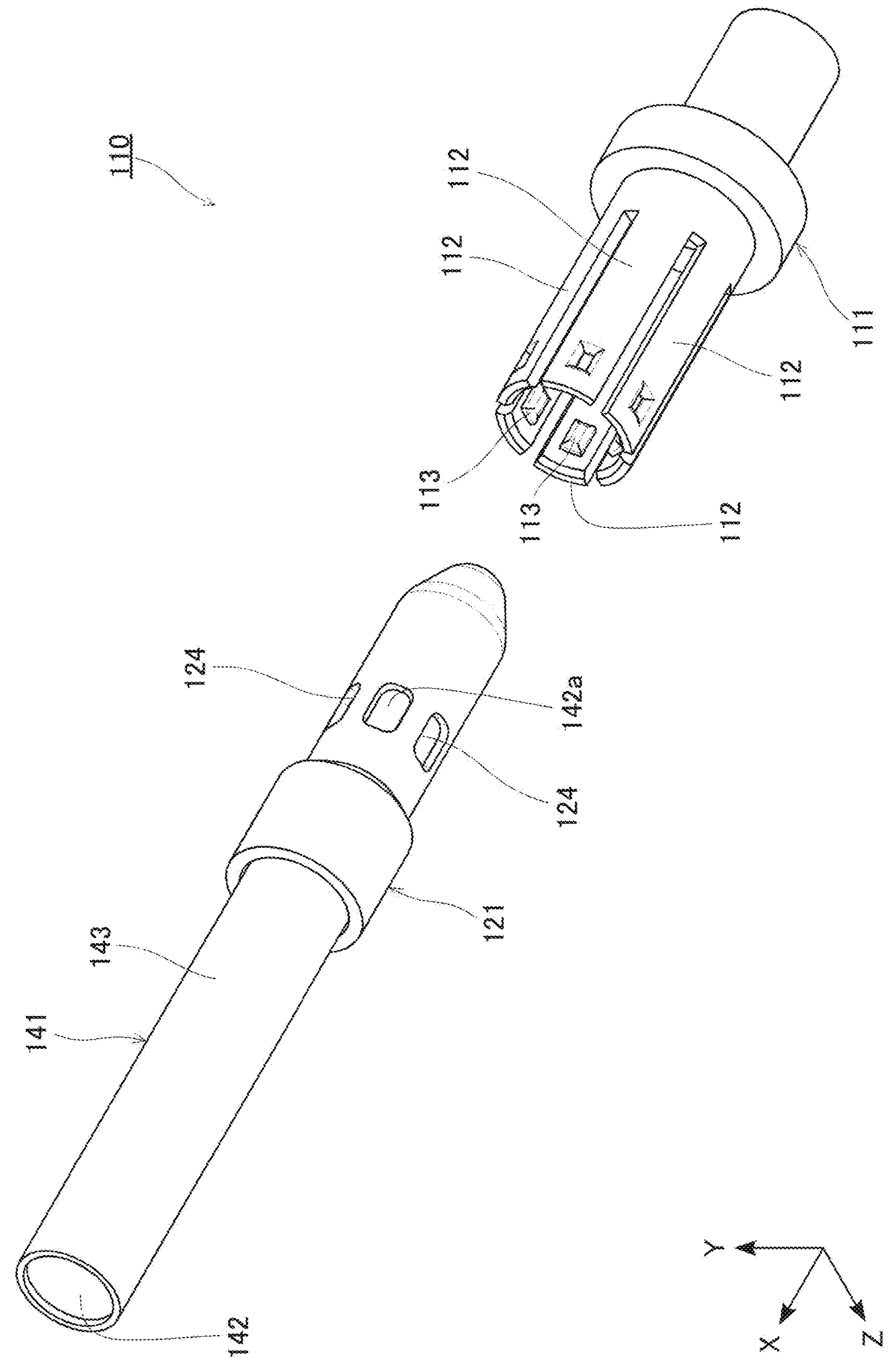
FIG. 20 is an exploded perspective view of the terminal unit according to the third embodiment illustrated in FIG. 18.
Figure 21:
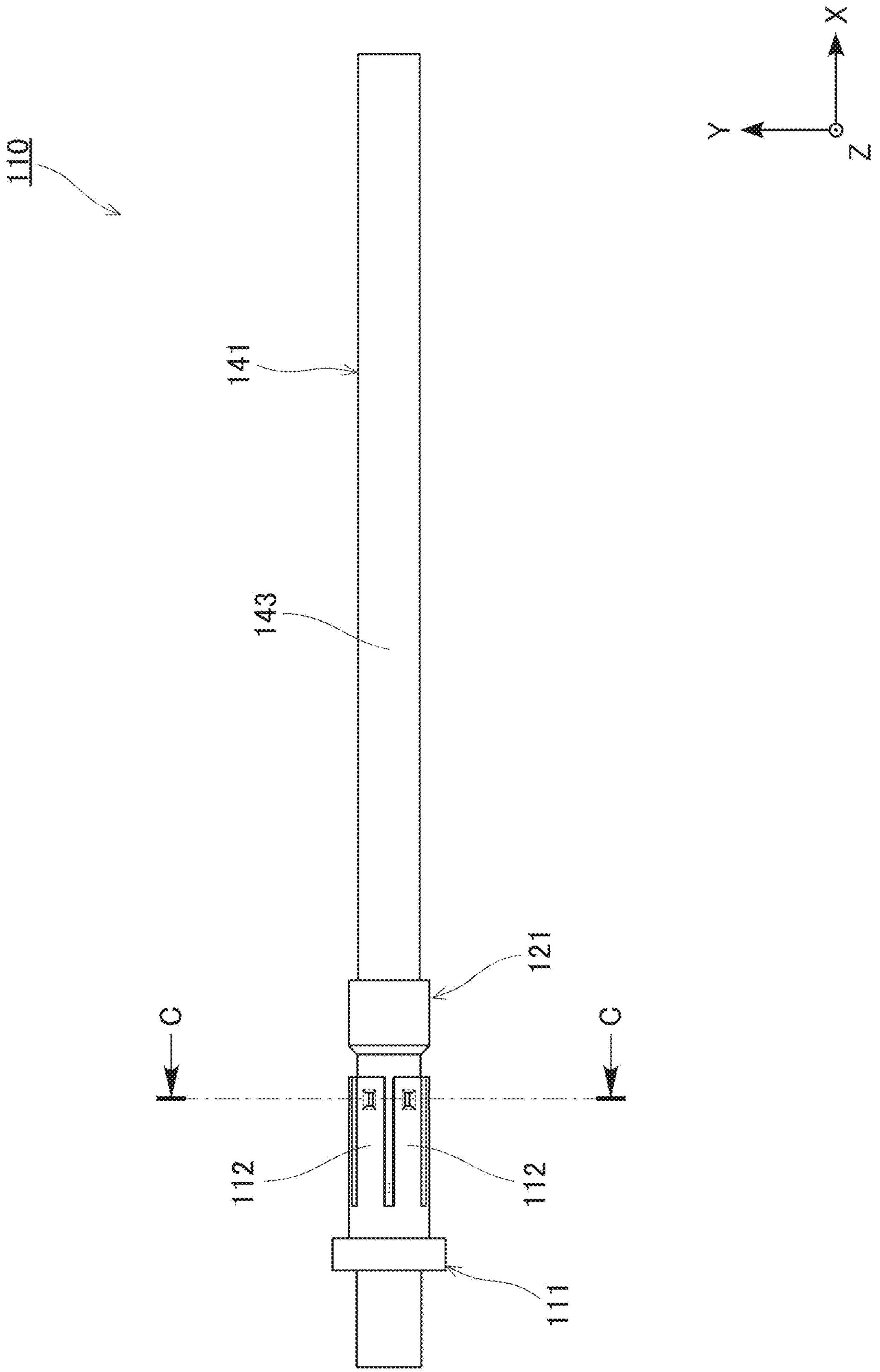
FIG. 21 is a front view for describing a connection state of a first terminal and a second terminal according to the third embodiment.

The first terminal 111 is a member made of a conductive metal, and is a member formed as an elastic socket in a cylindrical shape. As illustrated in FIG. 20, for example, the first terminal 111 of the third embodiment includes six elastic force imparting arm parts 112 extending to the second terminal 121 side, and on the inner circumference side of each of these six elastic force imparting arm parts 112, projection contacts 113 which project toward the second terminal 121 side when the first terminal 111 and the second terminal 121 are assembled are formed one by one. In other words, the first terminal 111 has the six projection contacts 113 in total.

The second terminal 121 is a member made of a conductive metal, and is a member formed as a round pin. As illustrated in FIG. 20, for example, the second terminal 121 of the third embodiment has six through holes 124 on the outer circumference surface of a portion to be assembled against the first terminal 111. These six through holes 124 are portions into which the six projection contacts 113 possessed by the first terminal 111 are inserted, when the first terminal 111 and the second terminal 121 are assembled.

In addition, an electric wire 141 which can conduct electricity is installed in an end part that is on the opposite side of the portion to be assembled against the first terminal 111 which is the right side of the second terminal 121.

A twisted wire 142 formed by twisting multiple copper wires having conductivity is arranged inside the electric wire 141 of the third embodiment, and an insulator 143 as a protection member covers an outer circumference of this twisted wire 142. Furthermore, the insulator 143 is removed from an end part of the electric wire 141 that is on the side connected with the second terminal 121, and the twisted wire 142 is exposed, thereby forming the electric wire end 142*a*.

In the third embodiment, the second terminal 121 and the electric wire end 142*a* of the electric wire 141 are connected by pressure bonding. More specifically, by applying a swaging process in a state where the electric wire end 142*a* is inserted into the second terminal 121, the electric wire end 142*a* is fixed to the second terminal 121 by pressure bonding. At this time, the inner side of the six penetrating through holes 124 formed in the second terminal 121 is blocked by the electric wire end 142*a*. In other words, as illustrated in FIG. 20, for example, the second terminal 121 is formed such that, when the six through holes 124 formed in the second terminal 121 are seen from the outer circumference side, the electric wire end 142*a* can be visually observed through the through holes 124.

Figure 22:
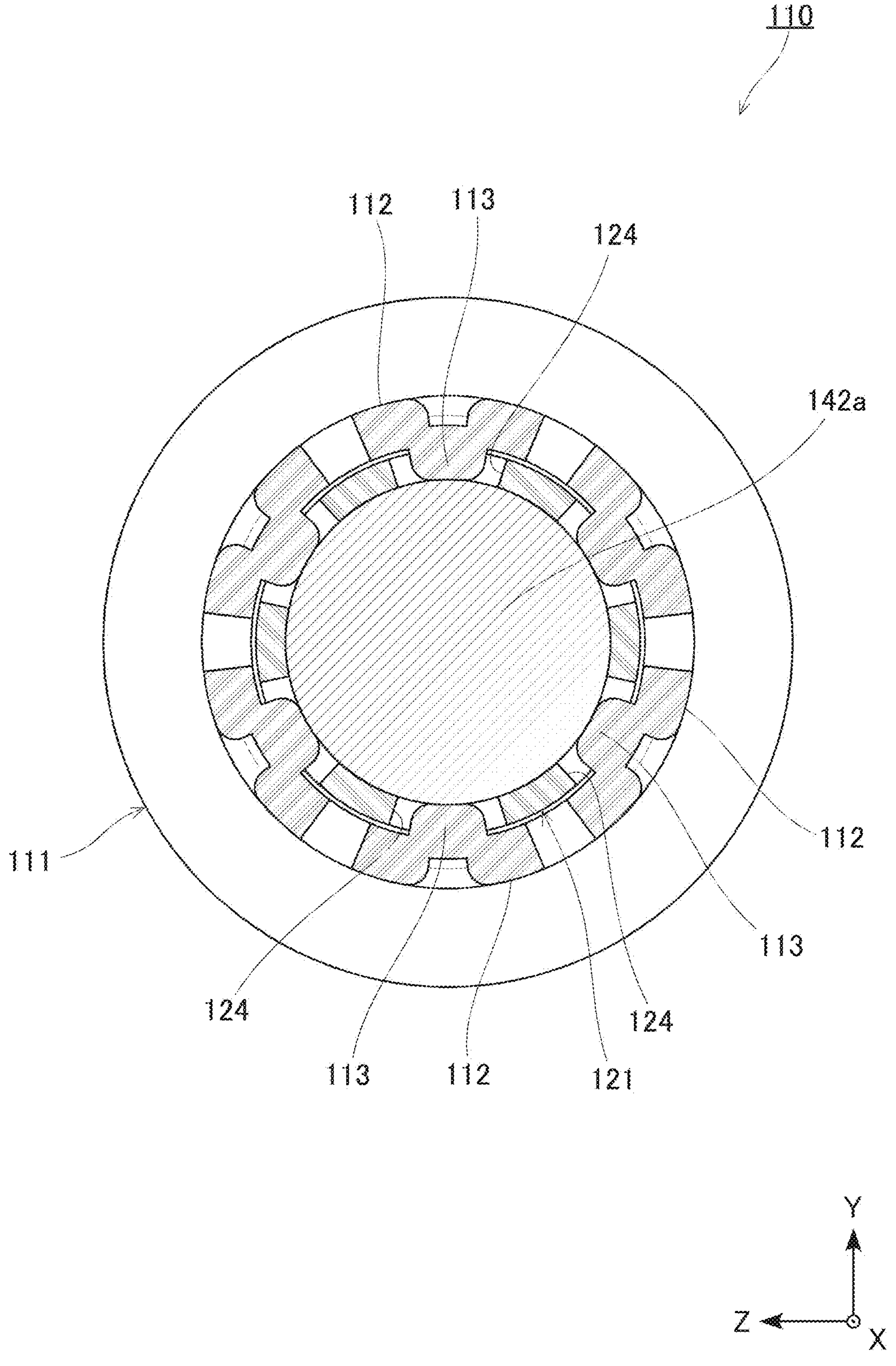
FIG. 22 is a cross-sectional view illustrating a C-C line cross section in FIG. 21.

Thus, when assembling the first terminal 111 and the second terminal 121, once each of the six projection contacts 113 possessed by the first terminal 111 is inserted into the six through holes 124, as illustrated in FIG. 22, the six projection contacts 113 directly contact the electric wire end 142*a*. In addition, at this time, since the six projection contacts 113 are pushed toward the electric wire end 142*a* due to inward elastic force exerted by the six elastic force imparting arm parts 112, each of the six projection contacts 113 is certainly fitted into the six through holes 124. Furthermore, since a height dimension of the six projection contacts 113 is formed to be a dimension greater than a depth dimension of the six through holes 124, the first terminal 111 and the second terminal 121 that are assembled are in a state where only the six projection contacts 113 are in direct contact with the electric wire end 142*a*. Accordingly, since electricity to be transmitted using the electric wire 141 can be electrically conducted and transmitted directly from the electric wire end 142*a* of the twisted wire 142 to the first terminal 111, it is possible to achieve the terminal unit 110 in which electric resistance is small and heat generation is little even if large electric current is applied.

In addition, since the electric wire end 142*a* in direct contact with the six projection contacts 113 is the twisted wire 142 having flexibility, when the first terminal 111 and the second terminal 121 are assembled and brought into contact with each other, the projection contacts 113 of the first terminal 111 dig into the electric wire end 142*a* which is the twisted wire 142. With such configuration, a difference in heights of the six projection contacts 113, an error at the time of assembly, and the like can be absorbed. Thus, since contact resistance can be reduced by multi-point contact, and rise in temperature can be suppressed when applying large electric current, it is possible to apply larger electric current.

Furthermore, in the third embodiment, the six projection contacts 113 possessed by the first terminal 111 are in a projected shape of a quadrilateral. On the other hand, the six through holes 124 possessed by the second terminal 121 are in a quadrilateral penetrating shape corresponding to the quadrilateral of the projection contacts 13. Thus, at the time of assembly of the first terminal 111 and the second terminal 121, even if the terminals move due to vibration or the like, by fitting of projections and recesses using the projection contacts 113 and the through holes 124 both in quadrilateral shapes, fitting parts work so as to inhibit such movement. Therefore, it becomes possible to suitably suppress wear of parts in direct contact with each other.

The first terminal 111 and the second terminal 121 according to the third embodiment which have been described above do not require the pressing member 31 used in the first and the second embodiments. Thus, the terminal unit 110 according to the third embodiment has a merit of reduced manufacturing cost or the like on the point that the number of components is small.

Regarding the assembly procedures of the terminal unit 110 according to the third embodiment, the six projection contacts 113 may be fitted into the six through holes 124 by fitting the first terminal 111 into the second terminal 121. In this manner, as illustrated in FIG. 22, since the six projection contacts 113 directly contact the electric wire end 142*a* in the first terminal 111 and the second terminal 121, the terminal unit 110 having an extremely short electric conduction path is achieved. Accordingly, with the terminal unit 110 according to the third embodiment, electric resistance can be made small, and heat generation can be made little even if large electric current is applied.

The configurations and the assembly procedures of the terminal unit 110 according to the third embodiment have been described above by using FIG. 17 to FIG. 22. However, the technical scope of the present invention is not limited to the scope described in the above-described embodiment. Various alterations or improvements can be added to the above-described embodiment.

For example, the above-mentioned third embodiment exemplified a case in which the second terminal 121 and the electric wire end 142*a* of the electric wire 141 are connected by pressure bonding. However, various connection means can be used for the connection means of the second terminal 121 and the electric wire end 142*a*.

Preferable embodiments of the present invention have been described above. Next, a fourth embodiment to which the present invention is applicable will be described by using FIG. 23 to FIG. 32.

Fourth Embodiment

A terminal unit 210 according to the fourth embodiment will be described by using FIG. 23 to FIG. 32.

As illustrated in FIG. 23 to FIG. 26, the terminal unit 210 according to the fourth embodiment includes a first terminal 211, a second terminal 221, and a pressing member 231.

Figure 27:
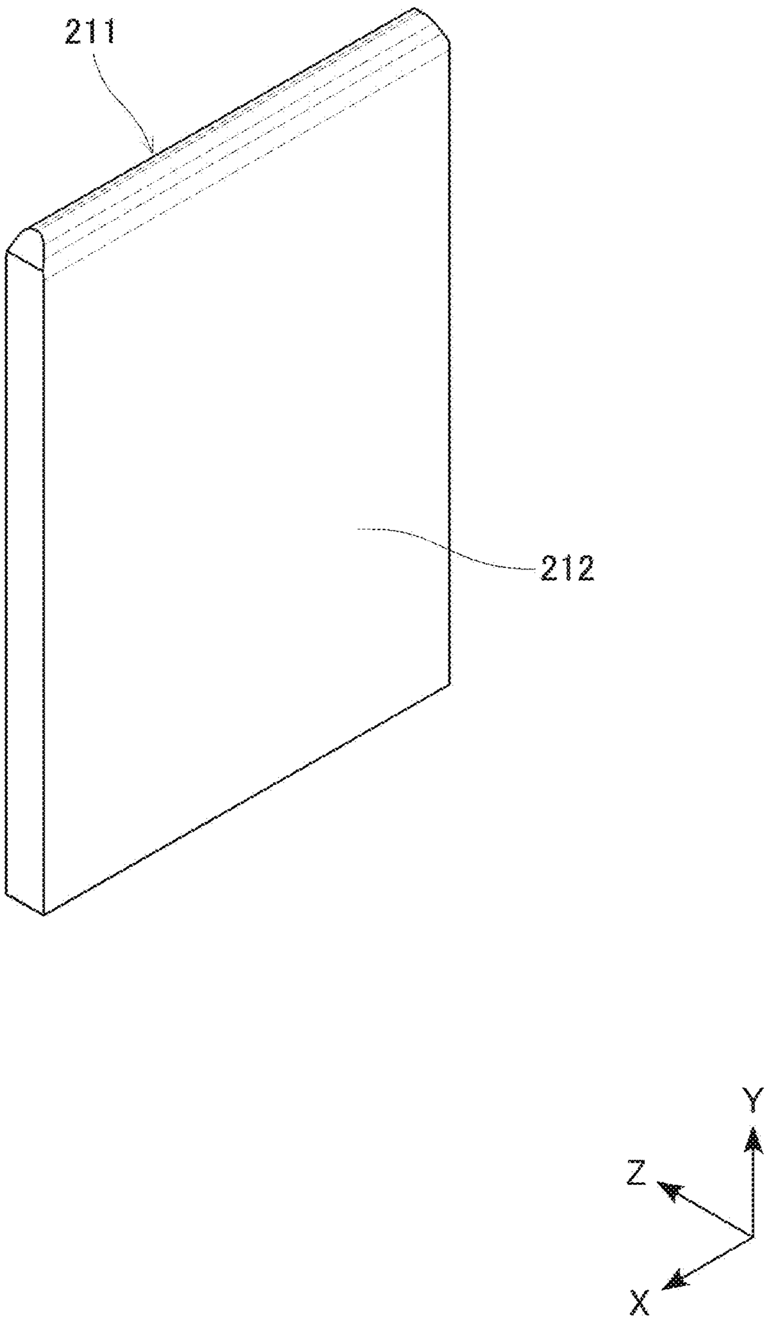
FIG. 27 is an external perspective view of a first terminal according to the fourth embodiment, seen from the back upper right.

The first terminal 211 is a member made of a conductive metal, and is formed as a single plate member in a flat-plate shape. As illustrated in FIG. 27, the rear surface side of the first terminal 211 in the fourth embodiment is a first terminal side assembly surface 212 in a flat-plate shape. This first terminal side assembly surface 212 is a portion to be brought into contact with balls 225 as spherical contacts, which will be described below, at the time of assembly of the first terminal 211 and the second terminal 221.

Figure 28:
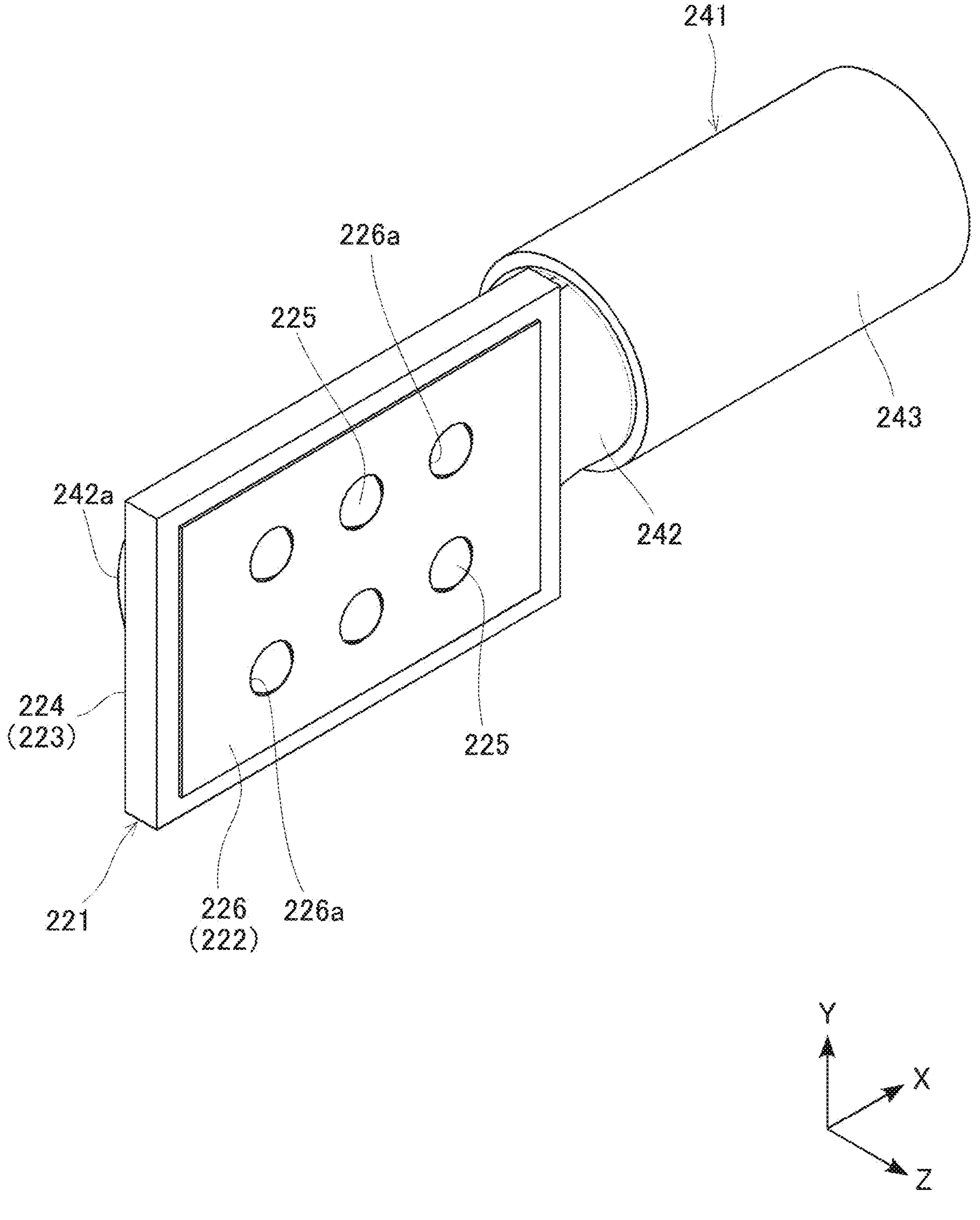
FIG. 28 is an external perspective view of a second terminal according to the fourth embodiment, seen from the front upper left.
Figure 29:
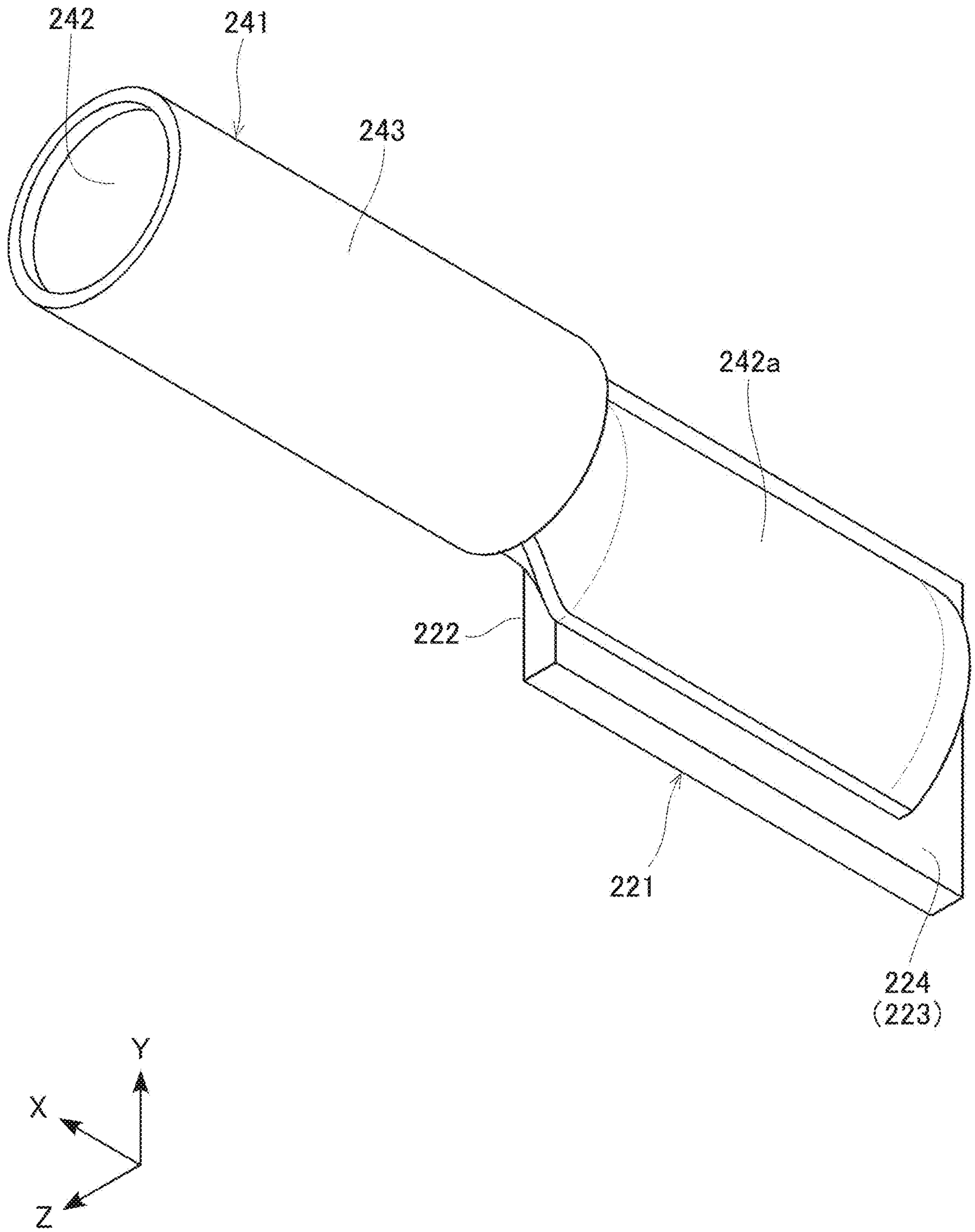
FIG. 29 is an external perspective view of the second terminal according to the fourth embodiment, seen from the back lower right.

The second terminal 221 is a member made of a conductive metal. As illustrated in FIG. 28 and FIG. 29, the front surface side of the second terminal 221 in the fourth embodiment is a second terminal side assembly surface 222 in a flat-plate shape, and the rear surface side thereof is a twisted wire attachment surface 223 in a flat-plate shape. The front surface and the rear surface of the second terminal 221, where the second terminal side assembly surface 222 and the twisted wire attachment surface 223 are formed, are arranged such that those surfaces are superposed when seen in the Z direction, which is the front and back direction. In addition, the second terminal side assembly surface 222 is a portion that is arranged opposingly to the first terminal side assembly surface 212 possessed by the first terminal 211, when the first terminal 211 and the second terminal 221 are assembled.

Figure 30:
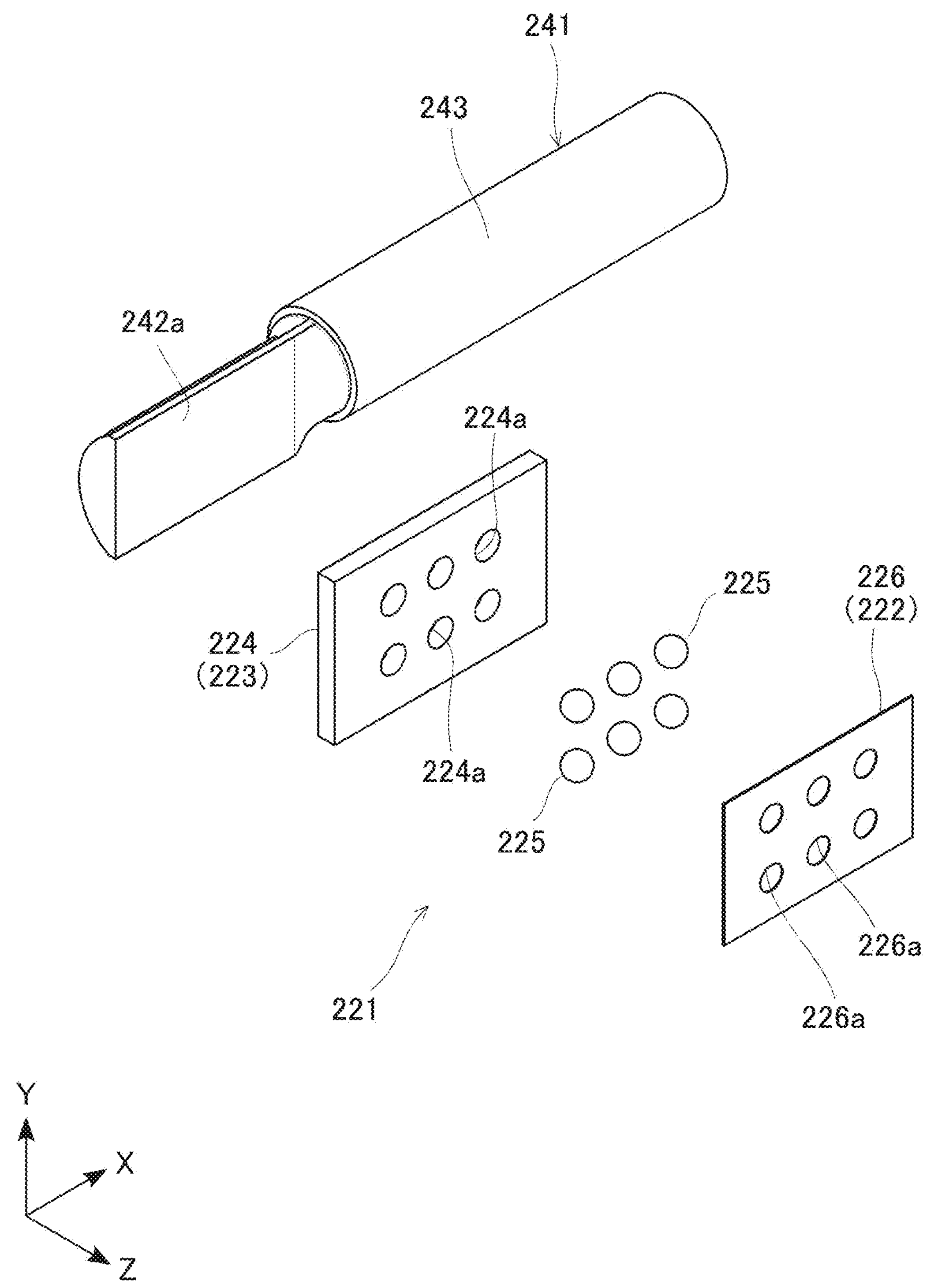
FIG. 30 is an exploded perspective view of the second terminal according to the fourth embodiment illustrated in FIG. 28.
Figure 31:
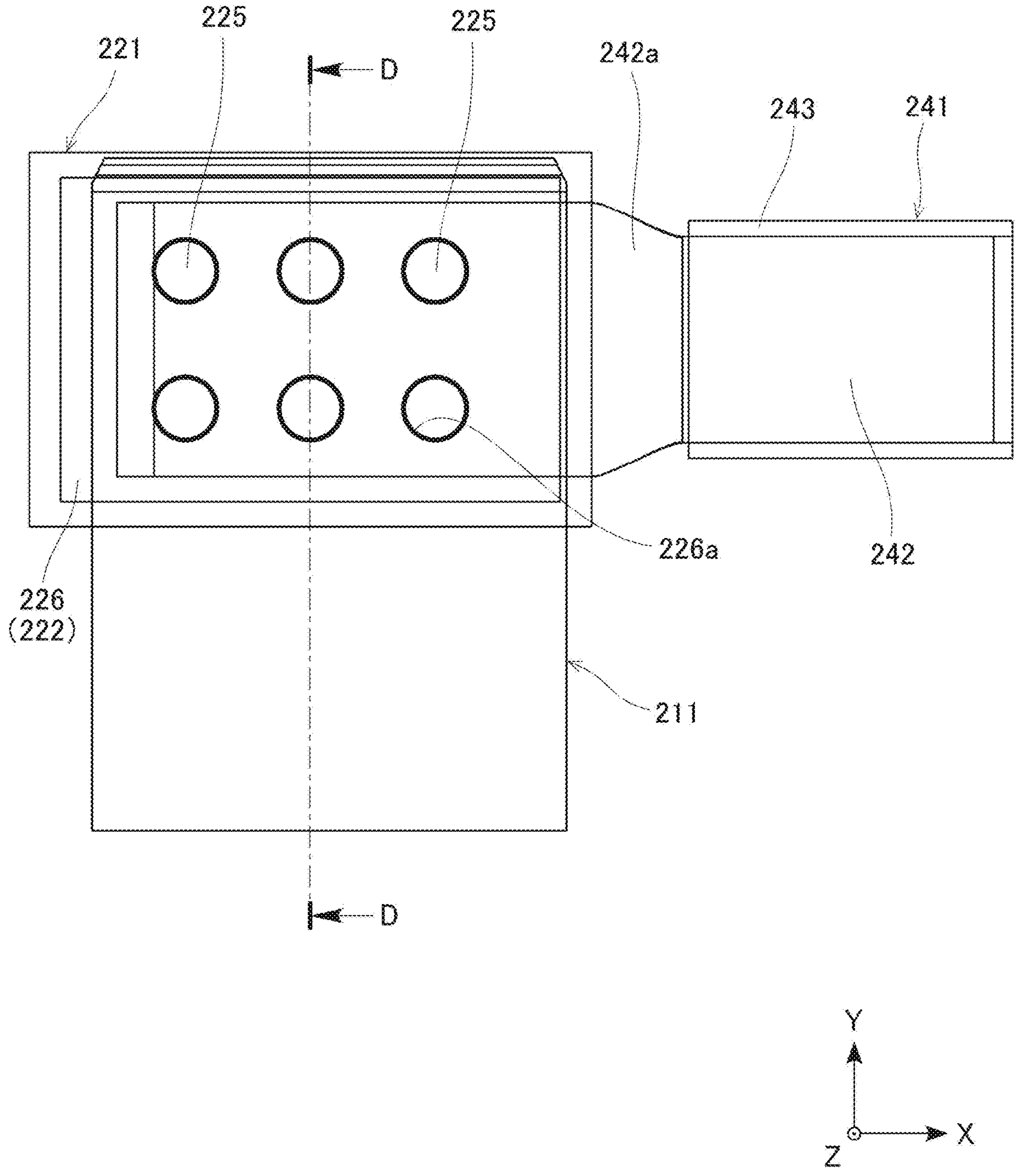
FIG. 31 is a transparent front view for describing a connection state of the first terminal and the second terminal according to the fourth embodiment.
Figure 32:
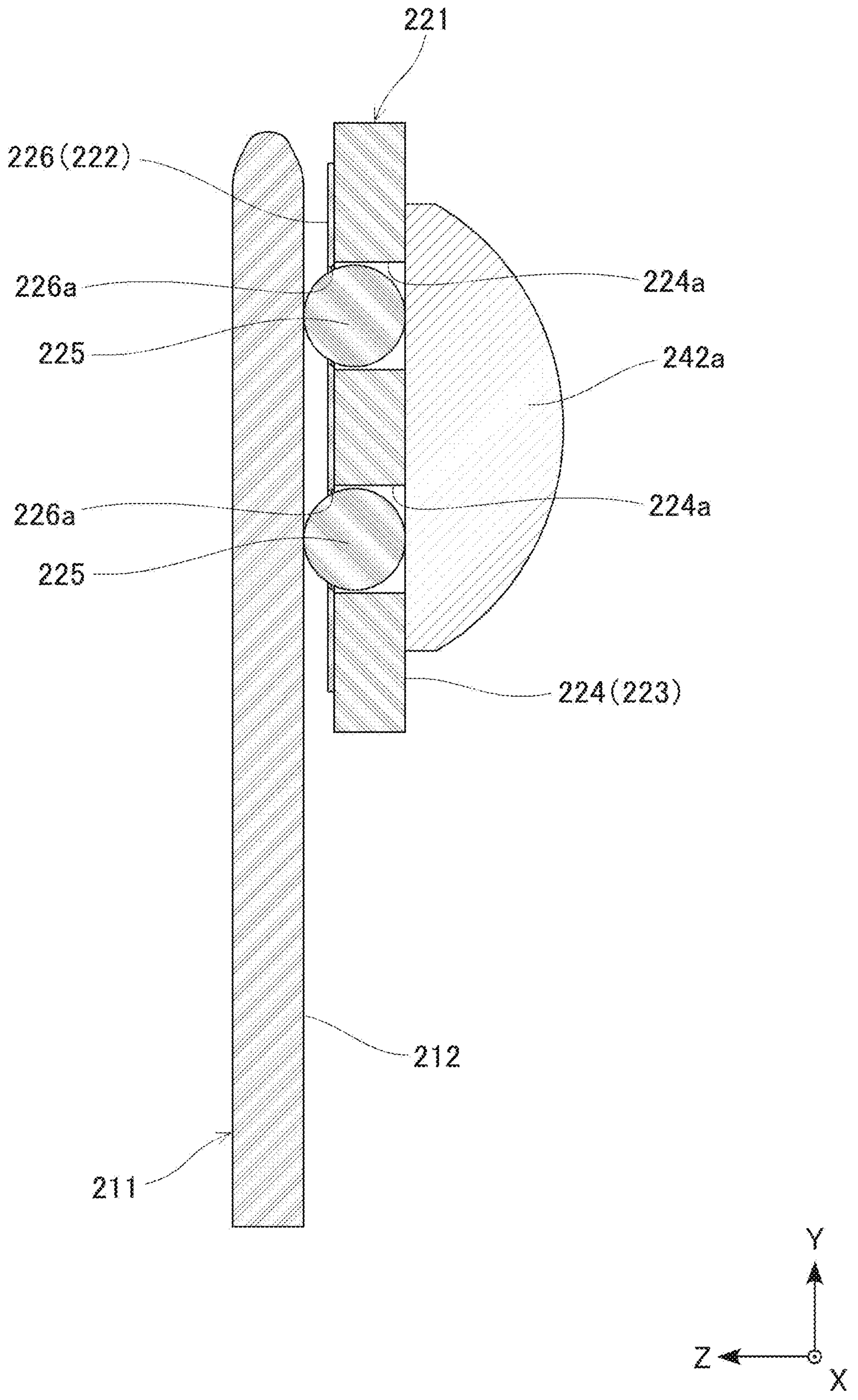
FIG. 32 is a cross-sectional view illustrating a D-D line cross section in FIG. 31.
Figure 33:
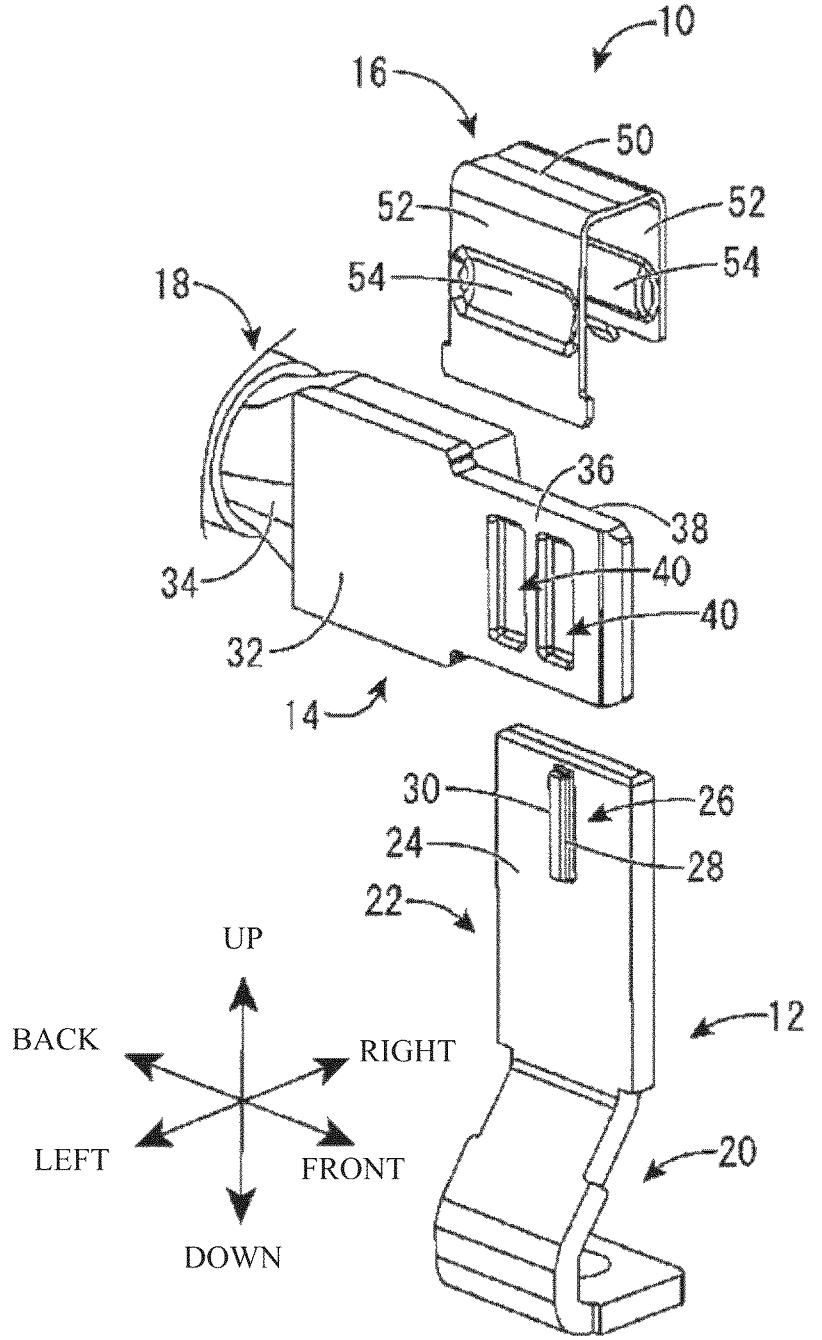
FIG. 33 is an exploded perspective view illustrating an example of a schematic configuration of a terminal unit in Japanese Patent Laid-Open No. 2022-150224.

Furthermore, as is apparent by referring to and comparing FIG. 28 to FIG. 30, the second terminal 221 of the fourth embodiment is formed of a second terminal body part 224 in a flat-plate shape having six ball holding holes 224*a*, six balls 225 as the spherical contacts to be stored one each in each of the six ball holding holes 224*a*, an electric wire end 242*a*, which will be described below, attached on the opposite side of the second terminal side assembly surface 222 so as to block the six ball holding holes 224*a*, and a ball presser plate 226 attached on the side of the second terminal side assembly surface 222 in a state where the balls 225 are stored in the ball holding holes 224*a*, which retains a part of the top surfaces of the balls 225 in a state projecting to the first terminal 211 side. In other words, as illustrated in FIG. 32, in the second terminal 221 of the fourth embodiment, each of the six balls 225 is sandwiched between the electric wire end 242*a* and the ball presser plate 226 while being stored in each of the six ball holding holes 224*a* possessed by the second terminal body part 224, and is arranged in a freely rotatable state. It should be noted that the ball presser plate 226 is formed to have circular opening holes 226*a* which are formed in a diameter dimension smaller than a diameter of the balls 225. In addition, a depth dimension of the ball holding holes 224*a* storing the balls 225 is formed to be a dimension smaller than the diameter of the balls 225. Thus, a part of the top surface of the six balls 225 on the side of the second terminal side assembly surface 222 is protruded forward (+Z direction) from the opening holes 226*a* of the ball presser plate 226.

As mentioned above, an electric wire 241, which is electrically conductive, is connected with the twisted wire attachment surface 223. As illustrated in FIG. 29 and the like, for example, a twisted wire 242 formed by twisting multiple copper wires having conductivity is arranged inside the electric wire 241 of the fourth embodiment, and an insulator 243 as a protection member covers an outer circumference of this twisted wire 242. Furthermore, the insulator 243 is removed from an end part of the electric wire 241 that is on the side connected with the twisted wire attachment surface 223, and the twisted wire 242 is exposed, thereby forming the electric wire end 242*a*.

In addition, in the fourth embodiment, the twisted wire attachment surface 223 of the second terminal 221 and the electric wire end 242*a* of the electric wire 241 are connected by adhesion. At this time, since the electric wire end 242*a* is adhered so as to cover the back surface of the twisted wire attachment surface 223, the penetrating six ball holding holes 224*a* formed in the second terminal body part 224 are in a state where the back side of the second terminal body part 224 is blocked by the electric wire end 242*a*. Accordingly, as illustrated in FIG. 32, in the second terminal 221, the six balls 225 as the spherical contacts are retained in a rotatable state while directly contacting the electric wire end 242*a*.

Figure 23:
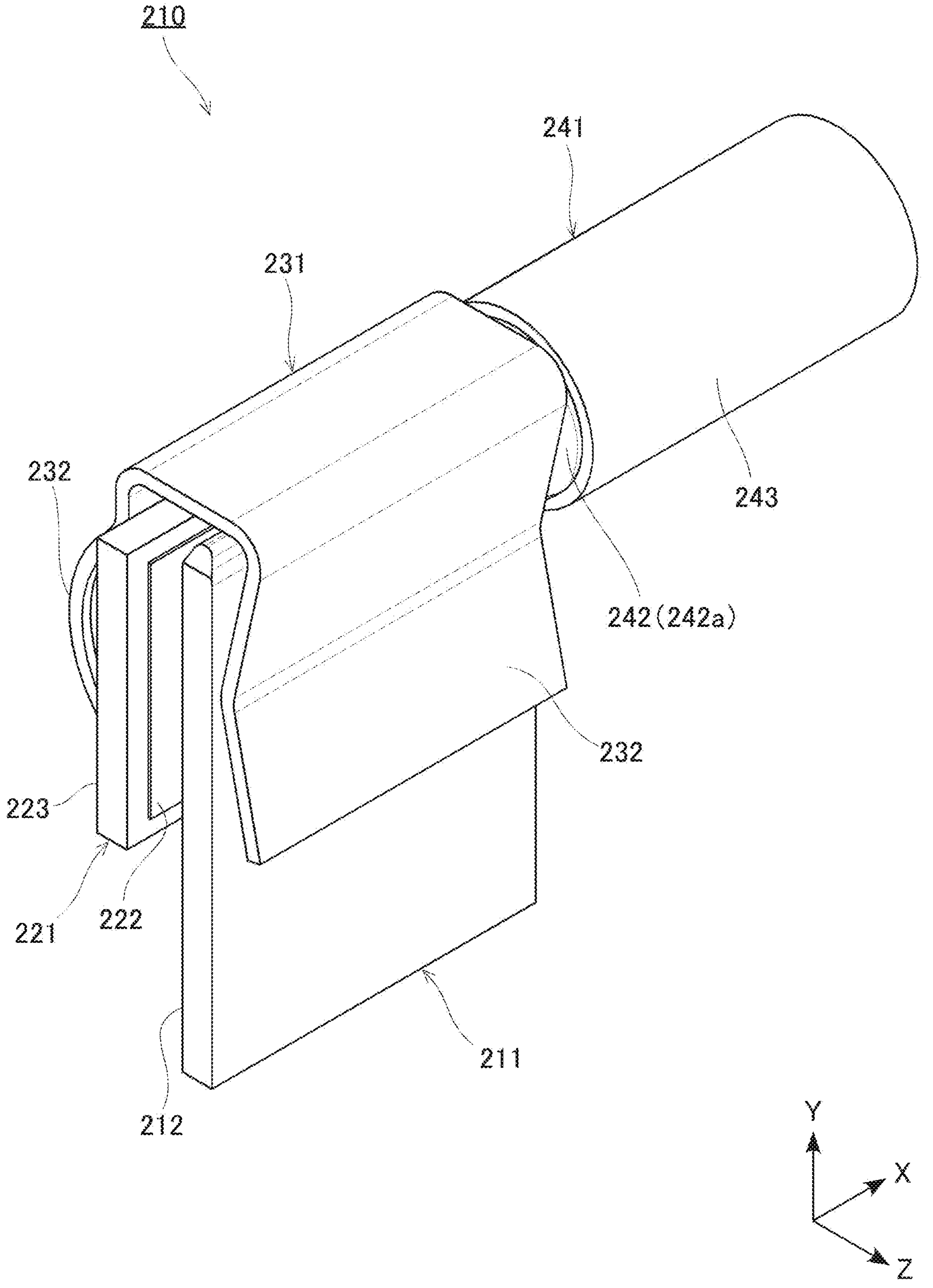
FIG. 23 is an external perspective view of a terminal unit according to a fourth embodiment, seen from the front upper left.
Figure 24:
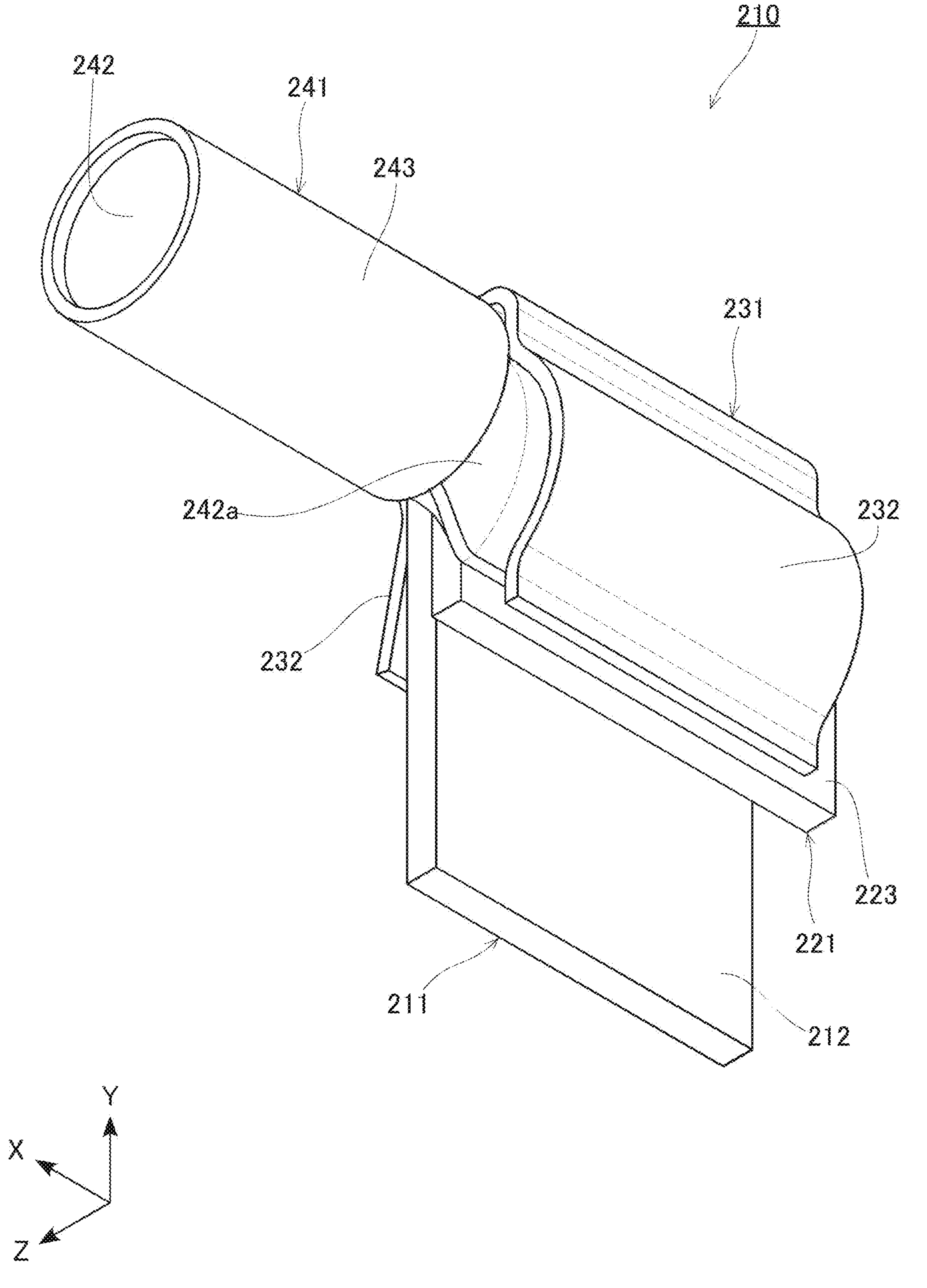
FIG. 24 is an external perspective view of the terminal unit according to the fourth embodiment, seen from the back lower right.

As illustrated in FIG. 23 and FIG. 24, the first terminal 211 and the second terminal 221 described above can retain a state where the terminals are connected with each other by the pressing member 231. This pressing member 231 is a member in a clip shape which is formed to have two plate-like elastic parts 232 capable of exerting elastic force as pressing force against the front surface and the back surface of the pressing member 231. Furthermore, by assembling the first terminal side assembly surface 212 of the first terminal 211 and the second terminal side assembly surface 222 of the second terminal 221 in a state where those surfaces oppose each other, as illustrated in FIG. 32, this pressing member 231 exerts elastic force which presses the first terminal side assembly surface 212 of the first terminal 211 and the six balls 225 as the spherical contacts against each other such that the first terminal 211 and the second terminal 221 can be connected with each other and retained. It should be noted that the pressing member of the present invention can be formed of any member as long as it is a member capable of exerting pressing force. For example, a pressing member using fastening power such as a bolt can be employed.

Figure 34:
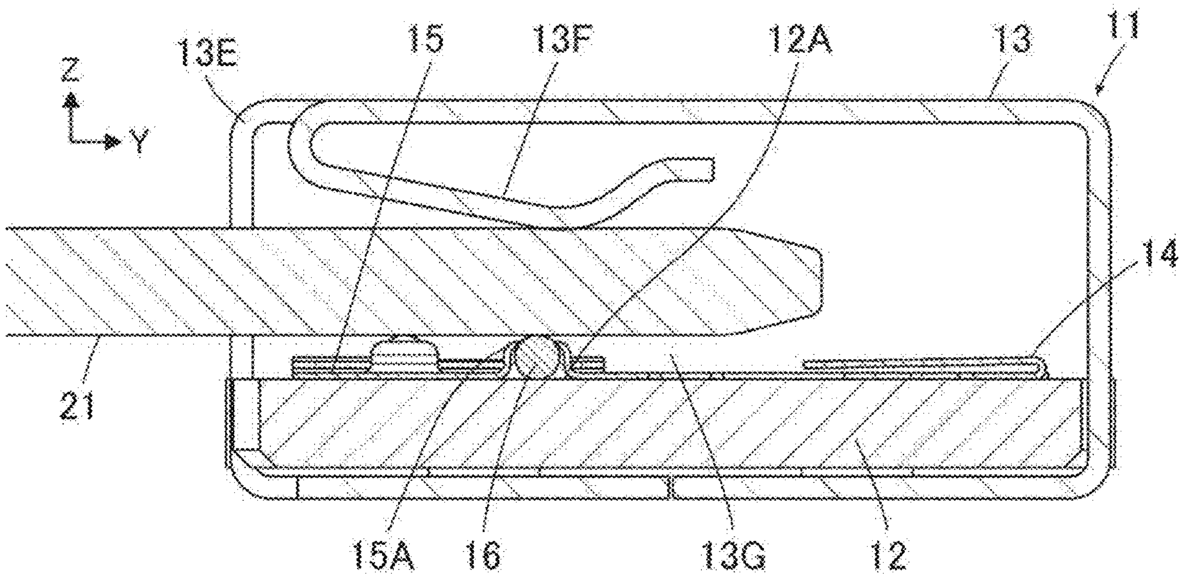
FIG. 34 is a cross-sectional view illustrating an example of a schematic configuration of a terminal unit in Japanese Patent Laid-Open No. 2023-097644.

In addition, when the first terminal 211 and the second terminal 221 are assembled, the six balls 225 as the spherical contacts which are retained in a rotatable state dig into the electric wire end 242*a* upon receiving pressing force from the first terminal side assembly surface 212 of the first terminal 211. In this regard, a technique of connecting terminals by using balls that are spherical terminals is publicly-known from Japanese Patent Laid-Open No. 2023-097644 illustrated in FIG. 34. However, in the conventional art illustrated in FIG. 34, a ball (16) which is sandwiched between a connector terminal (12) and an opposing connector terminal (21) does not directly contact an electric wire end. It should be noted that, reference signs relating to descriptions of the prior art document are enclosed in brackets for distinction from the embodiments of the invention of the present application.

In contrast, as illustrated in FIG. 32, in the terminal unit 210 according to the fourth embodiment, since the balls 225 directly contact the electric wire end 242*a* without interposing the second terminal 221, the terminal unit 210 having an extremely short electric conduction path is achieved. Accordingly, with the terminal unit 210 according to the fourth embodiment, electric resistance can be made small, and heat generation can be made little even if large electric current is applied. Furthermore, since the balls 225 directly connect the first terminal 211 and the electric wire end 242*a* without interposing the second terminal 221, while digging into the electric wire end 242*a*, a stable connection state of contact members can be achieved.

In addition, since the electric wire end 242*a* which is in direct contact with the six balls 225 as the spherical contacts is the twisted wire 242 having flexibility, in a state where the first terminal 211 and the second terminal 221 are assembled and brought into contact with each other, the six balls 225 dig into the electric wire end 242*a* which is the twisted wire 242 in a rotatable state (while rotating, depending on conditions). With such configuration, an error in an installation position of the six balls 225, an error in a diameter dimension of the balls 225, a manufacturing error at the time of assembly, and the like can be absorbed. Thus, since contact resistance can be reduced by multi-point contact, and rise in temperature can be suppressed when applying large electric current, it is possible to apply larger electric current.

The configurations of the terminal unit 210 according to the fourth embodiment have been described above. Next, procedures of forming the terminal unit 210 by assembling the first terminal 211, the second terminal 221, and the pressing member 231 will be described.

Figure 25:
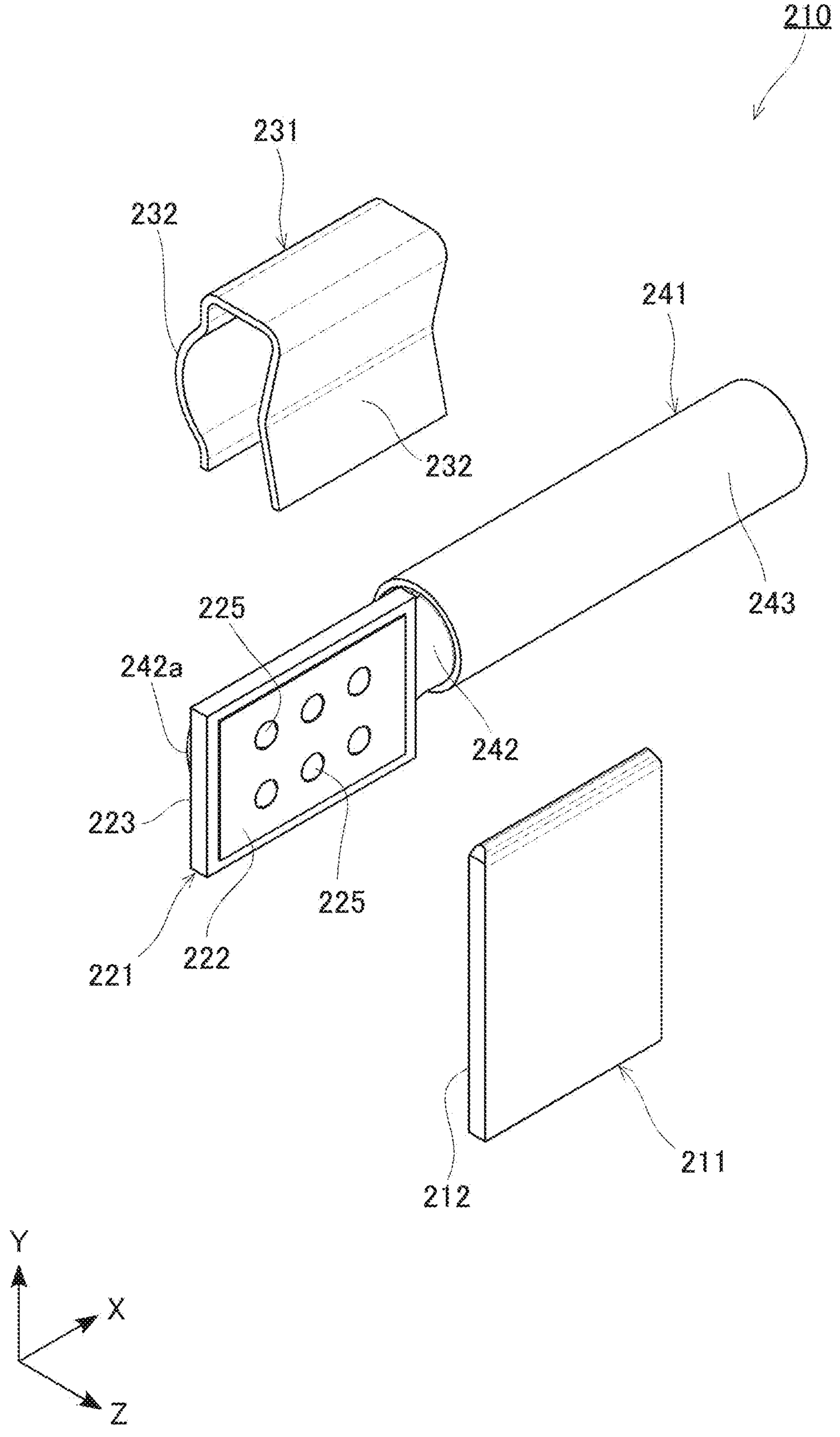
FIG. 25 is an exploded perspective view of the terminal unit according to the fourth embodiment illustrated in FIG. 23.
Figure 26:
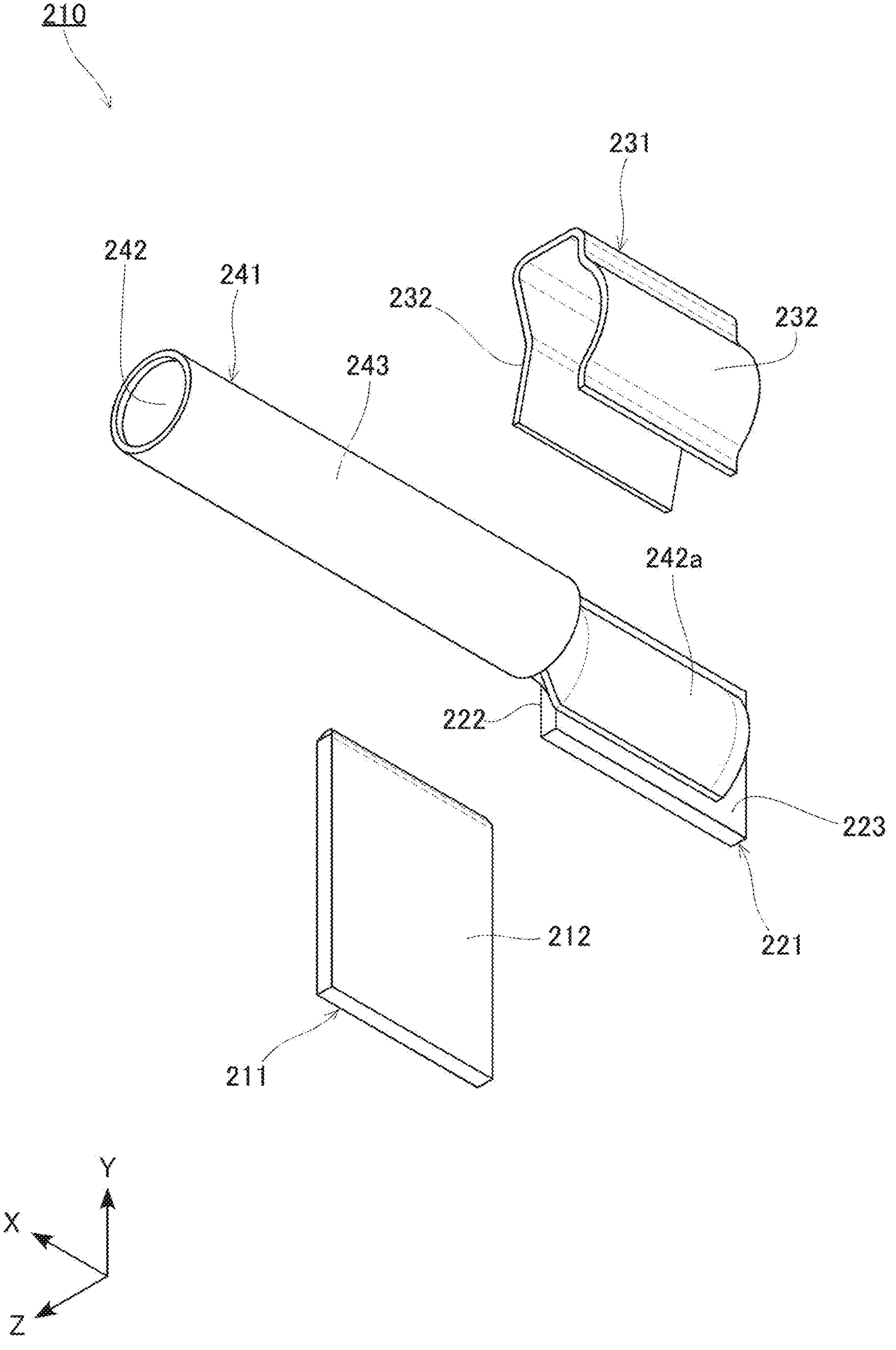
FIG. 26 is an exploded perspective view of the terminal unit according to the fourth embodiment illustrated in FIG. 24.

The procedures of forming the terminal unit 210 by assembling the first terminal 211, the second terminal 221, and the pressing member 231 will be described by referring to FIG. 25, for example. Firstly, the first terminal side assembly surface 212 of the first terminal 211 is moved in a backward direction (−Z direction) toward the second terminal side assembly surface 222 of the second terminal 221, and the six balls 225 possessed by the second terminal 221 are brought into contact with the first terminal side assembly surface 212 possessed by the first terminal 211. From this state, the pressing member 231 is moved in a downward direction (−Y direction) to sandwich the first terminal 211 and the second terminal 221 with the two plate-like elastic parts 232, thereby achieving the state illustrated in FIG. 23. In a process of achieving such state, with pressing force consisting of elastic force exerted from the two plate-like elastic parts 232 possessed by the pressing member 231, the six balls 225 dig into the electric wire end 242*a* which is the twisted wire 242 in a rotatable state (while rotating, depending on conditions). Thus, stable assembly of the first terminal 211 and the second terminal 221 is completed in a state where the first terminal side assembly surface 212 of the first terminal 211 and the second terminal side assembly surface 222 of the second terminal 221 oppose each other.

It should be noted that, as illustrated in FIG. 32, in the first terminal 211 and the second terminal 221, the first terminal side assembly surface 212 of the first terminal 211 is connected with the electric wire end 242*a* while interposing only the six balls 225 as the spherical contacts. Thus, the terminal unit 210 having an extremely short electric conduction path is achieved. Accordingly, with the terminal unit 210 according to the fourth embodiment, electric resistance can be made small, and heat generation can be made little even if large electric current is applied.

The configurations and the assembly procedures of the terminal unit 210 according to the fourth embodiment have been described above by using FIG. 23 to FIG. 32. However, the technical scope of the present invention is not limited to the scope described in the above-described embodiment. Various alterations or improvements can be added to the above-described embodiment.

For example, the above-mentioned fourth embodiment exemplified a case in which the twisted wire attachment surface 223 of the second terminal 221 and the electric wire end 242*a* of the electric wire 241 are connected by adhesion. However, besides a means of bonding the twisted wire attachment surface 223 of the second terminal 221 and the electric wire end 242*a* of the electric wire 241 in a molecular level by heat, various connection means included in the definition of adhesion such as soldering or welding can be used for adhesion as this connection means.

In addition, for example, the terminal units 10, 110, 210 according to the above-mentioned first to fourth embodiments are show with configuration examples in which the six projection contacts 13, 113 or the six balls 225 are arranged as contacts for directly contacting the electric wire ends 42*a*, 142*a*, 242*a*. However, any number of one or more can be selected as the number of contacts (the projection contacts or the spherical contacts) applicable to the present invention.

In addition, for example, in the terminal units 10, 110, 210 according to the above-mentioned first to fourth embodiments, the length of the illustrated electric wires 41, 141, 241 is made short in accordance with the range of the drawings. However, any length can be set as the length of the electric wire to be applied to the terminal unit of the present invention.

It is apparent from the descriptions in the Claims that embodiments to which such alterations or improvements are added may also be included in the technical scope of the present invention.

It should be noted that the terminal unit according to the present invention can be used in, for example, a portion which handles large electric current in a vehicle.

REFERENCE SIGNS LIST

10: terminal unit (of the first and the second embodiments)
11: first terminal
12: first terminal side assembly surface
13: projection contact
21: second terminal
22: second terminal side assembly surface
23: twisted wire attachment surface
24: through hole
25: swaging wall surface part
31: pressing member
32: plate-like elastic part
41: electric wire
42: twisted wire
42*a*: electric wire end
43: insulator
110: terminal unit (of the third embodiment)
111: first terminal
112: elastic force imparting arm part
113: projection contact
121: second terminal
124: through hole
141: electric wire
142: twisted wire
142*a*: electric wire end
143: insulator
210: terminal unit (of the fourth embodiment)
211: first terminal
212: first terminal side assembly surface
221: second terminal
222: second terminal side assembly surface
223: twisted wire attachment surface
224: second terminal body part
224*a*: ball holding hole
225: ball (spherical contact)
226: ball presser plate
226*a*: opening hole
231: pressing member
232: plate-like elastic part
241: electric wire
242: twisted wire
242*a*: electric wire end
243: insulator

What is claimed is:

1. A terminal unit, comprising:
a first terminal;
a second terminal which is assembled to and connected with the first terminal;
an electric wire end which is connected with the second terminal; and
a pressing member which presses the first terminal and the second terminal against each other for contact, wherein
the first terminal has a first terminal side assembly surface to which the second terminal is assembled and at least one projection contact projecting in a direction orthogonal to the first terminal side assembly surface,
the second terminal has a second terminal side assembly surface to which the first terminal is assembled and at least one through hole through which the electric wire end is visually observed from the second terminal side assembly surface, and in a state where the first terminal and the second terminal are assembled and contacted with each other by being pressed by the pressing member, the at least one projection contact of the first terminal directly contacts the electric wire end through the at least one through hole of the second terminal.

2. The terminal unit according to claim 1, wherein the electric wire end is a twisted wire having flexibility, and in a state where the first terminal and the second terminal are assembled and contacted with each other, the at least one projection contact of the first terminal bites into the twisted wire.

3. The terminal unit according to claim 1, wherein the first terminal side assembly surface of the first terminal and the second terminal side assembly surface of the second terminal are formed in flat-plate shapes, the second terminal and the electric wire end are connected by adhesion, the at least one projection contact of the first terminal is formed in a quadrilateral projected shape, the at least one through hole of the second terminal is formed in a quadrilateral penetrating shape corresponding to the quadrilateral projected shape of the at least one projection contact.

4. The terminal unit according to claim 1, wherein the first terminal side assembly surface of the first terminal and the second terminal side assembly surface of the second terminal are formed in flat-plate shapes, the second terminal and the electric wire end are connected by pressure bonding, the at least one projection contact of the first terminal is formed in a quadrilateral projected shape, the at least one through hole of the second terminal is formed in a quadrilateral penetrating shape corresponding to the quadrilateral projected shape of the at least one projection contact.

* * * * *